United States Patent
Gu et al.

(10) Patent No.: US 8,604,134 B2
(45) Date of Patent: *Dec. 10, 2013

(54) MODIFIED VINYLAMINE-CONTAINING POLYMERS AS ADDITIVES IN PAPERMAKING

(75) Inventors: Qu-Ming Gu, Bear, DE (US); Jonathan M. McKay, Wilmington, DE (US); Richard J. Riehle, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 1418 days.

This patent is subject to a terminal disclaimer.

(21) Appl. No.: 12/221,220

(22) Filed: Jul. 31, 2008

(65) Prior Publication Data

US 2009/0043051 A1    Feb. 12, 2009

Related U.S. Application Data

(60) Provisional application No. 60/963,064, filed on Aug. 2, 2007.

(51) Int. Cl.
| | | |
|---|---|---|
| *C08F 8/44* | (2006.01) | |
| *C08F 226/02* | (2006.01) | |
| *C08F 226/06* | (2006.01) | |
| *D21H 17/34* | (2006.01) | |
| *D21H 17/45* | (2006.01) | |
| *D21H 23/04* | (2006.01) | |
| *C08F 8/02* | (2006.01) | |
| *C08F 8/10* | (2006.01) | |

(52) U.S. Cl.
USPC ...... 525/328.4; 524/34; 525/54.2; 525/54.26; 525/328.2; 525/359.1; 525/359.3; 525/359.4; 525/385; 525/386; 162/164.6

(58) Field of Classification Search
USPC ............ 525/328.2, 328.4, 54.2, 54.26, 359.1, 525/359.3, 359.4, 385, 386; 526/312; 162/164.6; 524/34
See application file for complete search history.

(56) References Cited

U.S. PATENT DOCUMENTS

| | | | |
|---|---|---|---|
| 2,721,140 A | 10/1955 | Weisgerber | 92/3 |
| 4,421,602 A | 12/1983 | Brunnmueller et al. | 162/168.2 |
| 4,774,285 A | 9/1988 | Pfohl et al. | 525/60 |
| 5,292,441 A | 3/1994 | Chen et al. | 210/735 |
| 5,324,787 A | 6/1994 | Pinschmidt et al. | 515/328.2 |
| 5,430,110 A | 7/1995 | Ahlers et al. | 525/328.2 |
| 5,530,907 A | 6/1996 | Pavey et al. | 395/889 |
| 5,630,907 A | 5/1997 | Nilz et al. | 162/168.2 |
| 5,948,125 A | 9/1999 | Ouziel | |
| 5,961,782 A | 10/1999 | Luu et al. | 162/111 |
| 5,994,449 A | 11/1999 | Maslanka | 524/503 |
| 6,133,392 A | 10/2000 | Utecht et al. | 526/312 |
| 6,159,340 A | 12/2000 | Niessner et al. | 162/164.6 |
| 6,616,807 B1 | 9/2003 | Dyllick-Brenzinger et al. | 162/175 |
| 6,797,785 B1 | 9/2004 | Hund et al. | 525/328.2 |
| 6,824,650 B2 | 11/2004 | Lindsay et al. | 162/168.2 |
| 6,864,330 B2 | 3/2005 | Schneider et al. | 525/479 |
| 2004/0050513 A1 | 3/2004 | Beckman, Jr. et al. | 162/158 |
| 2006/0254738 A1 | 11/2006 | Anderson et al. | 162/175 |

FOREIGN PATENT DOCUMENTS

| | | | |
|---|---|---|---|
| EP | 0 251 182 B1 | 6/1987 | |
| JP | 10110010 | 4/1998 | |
| WO | WO 99/55742 | * 11/1999 | |

* cited by examiner

*Primary Examiner* — Fred M Teskin

(74) *Attorney, Agent, or Firm* — Michael J. Herman; Shaorong Chen; Joanne Rossi

(57) ABSTRACT

Vinylamine-containing polymers are disclosed where the amine groups are substituted with (1) cationic functional groups, (2) anionic functional groups, (3) hydrophobic functional groups, (4) hydrophilic functional groups, (5) functional groups that impart amphoteric characteristics to the polymers, or (6) combinations thereof. Also disclosed are processes for preparing such polymers, as well as compositions comprising such polymers. Among other applications, these polymers can be used in papermaking applications as dry strength additives, wet strength additives, retention aids, drainage aids, and pitch and stickies control agents.

9 Claims, No Drawings

MODIFIED VINYLAMINE-CONTAINING POLYMERS AS ADDITIVES IN PAPERMAKING

CROSS REFERENCE TO RELATED APPLICATIONS

This application claims the benefits of U.S. Provisional Applications No. 60/963,064, filed Aug. 2, 2007, the entire contents of which is herein incorporated by reference.

FIELD OF THE INVENTION

This invention relates to vinylamine-containing polymers and processes for preparing them, wherein the amine groups are substituted with (1) cationic functional groups, (2) anionic functional groups, (3) hydrophobic functional groups, (4) hydrophilic functional groups, (5) functional groups that impart amphoteric characteristics to the polymers, or (6) combinations thereof.

BACKGROUND OF THE INVENTION

Both partially hydrolyzed polyvinylformamide or fully hydrolyzed polyvinylformamide (i.e., polyvinylamine) can be used as dry strength additives, wet strength additives, retention aids, and drainage aids in papermaking. Polyvinylamine is highly cationic due to its high density of primary amine or amidine functionality. These polymers possess strong hydrogen bonding ability as a result of this high density of primary amine groups. U.S. Pat. No. 2,721,140 discloses use of polyvinylamine as an additive to make papers having high wet strength, while U.S. Pat. No. 5,961,782 discloses use of polyvinylamine to make crosslinkable creping adhesive formulations. U.S. Pat. No. 4,421,602 discloses a partially hydrolyzed, water-soluble polymer of N-vinylformamide that contains N-vinylformamide units and vinylamine units. It also discloses use of polyvinylamine and a 50% hydrolyzed polyvinylformamide to increase flocculation efficiencies, fines retention, and the drainage rate of pulp fiber in papermaking processes, while U.S. Pat. No. 6,159,340 discloses the use of such polymers as dry and wet strength additives in paper and paperboard production. U.S. Pat. Nos. 6,616,807 and 6,797,785 disclose use of polyvinylamines as drainage aids, flocculants, and retention aids in the paper making.

Polyvinylamines are typically made by solution, free-radical polymerization of N-vinylformamide monomer, followed by base- or acid-catalyzed hydrolysis, whereby the primary amine in the polymer backbone is deprotected, releasing formic acid. U.S. Pat. No. 4,774,285 discloses that N-vinylformamide monomer may be copolymerized with an additional vinyl monomer, e.g., vinyl acetate, and subsequently hydrolyzed to produce a water-soluble copolymer of vinylamine and vinyl alcohol, which may be used as wet and dry strength additives for papermaking. U.S. Pat. No. 5,630,907 discloses copolymer compositions containing both vinylamine and acrylic acid units, as well as their applications. U.S. Pat. No. 6,824,650 discloses using a polyvinylamine polymer with a polymeric anionic reactive compound to improve paper strength. U.S. Pat. No. 6,797,785 discloses copolymers containing vinylamine units in combination with either diallyldimethylammonium (chloride) (DADMAC) or acrylamide units via reverse emulsion polymerization, and their use as flocculants and coagulants in papermaking. EP 0251182 discloses copolymers containing vinylamine and acrylonitrile units for use in papermaking as drainage aids, retention aids, as well as wet end additives for increasing the dry strength of paper products. In general, these copolymers contain vinylamine units and additional vinyl units linked together randomly through carbon-carbon bonds in a linear fashion, where the additional vinyl units reduce the density of vinylamine units in the polymer backbone, thereby giving it a lower cationic charge density as compared to polyvinylamine homopolymer.

The amine functionality of polyvinylamine can react with a variety of compounds having reactive functional groups. Post-polymerization chemical modification of polyvinylamine with functional groups is an alternative approach to produce polyvinylamine derivatives with altered physical and application properties. U.S. Pat. No. 5,292,441 discloses the use of quaternized polyvinylamines as flocculants for wastewater clarification, where the quaternized polyvinylamines are obtained from the reaction of polyvinylamine with a quaternizing agent, such as methyl chloride, dimethyl sulfate, or benzyl chloride. U.S. Pat. No. 6,864,330 discloses a PEG grafted polyvinylamine derivative and also discloses that primary amines of the grafted polymer can be further cationized by reacting with an epoxide that contains the quaternary ammonium group. The grafted polymers are prepared by polymerizing vinylformamide in the presence of a PEG through free radical polymerization and are structurally different from polyvinylamine homopolymer and the copolymers. U.S. Pat. No. 5,994,449 discloses a resin composition that is the reaction product of epihalohydrin with a mixture of a poly(vinylamine-co-vinyl alcohol) copolymer and a polyaminoamide, as well as the use of these compositions as a creping adhesives.

BRIEF DESCRIPTION OF THE INVENTION

One embodiment of the present invention is a polymer comprising randomly distributed repeating monomer units having at least two of the formulae (I), (II), (III), (IV), (V), (VI), (VII), (XIII), or (XIV):

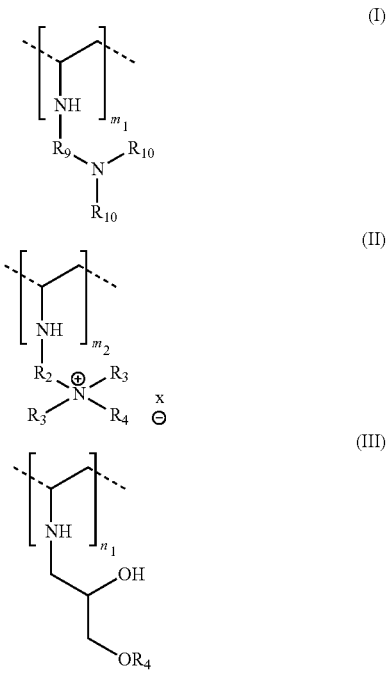

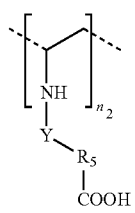
(IV)

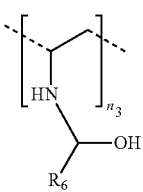
(V)

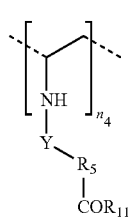
(VI)

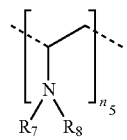
(VII)

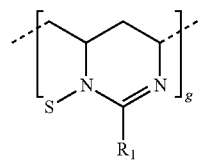
(XIII)

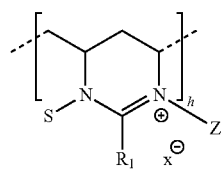
(XIV)

said polymer optionally further comprising randomly distributed repeating monomer units having at least one of the formulae (VIII), (IX), (X), or (XII):

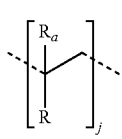
(VIII)

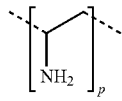
(IX)

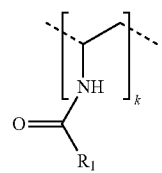
(X)

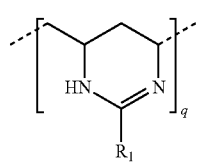
(XII)

wherein $X^-$ is any anion, preferably $Cl^-$, $Br^-$, or $I^-$; Y is —C(=O)— or —CH$_2$— or a single bond; R is any functionality, preferably H, —COOH, —COOR$_1$, —CH$_2$NR$_1$R$_4$, —NR$_1$R$_4$, —CONR$_1$R$_4$, —OH, —OCOR$_1$, —OR$_1$, —NO$_2$, —CN, —N$^+$(CH$_3$)$_3$, alkenyl, alkynyl, or alkanoxyl; $R_1$ and $R_4$, identically or differently, are H or a straight chain or branched alkyl containing up to 22 carbons; $R_a$ is H or CH$_3$; $R_2$ is a straight chain or branched alkyl group containing up to 12 carbons, optionally substituted with hydroxyl, preferably —CH$_2$CH(OH)CH$_2$— or —CH$_2$CH$_2$—; $R_3$ and $R_{10}$ are H, or a straight chain or branched alkyl containing up to 22 carbons, preferably —CH$_3$ or —CH$_2$CH$_3$; $R_5$ is a straight chain or branched alkyl or alkenyl group containing up to 18 carbons; $R_6$ is a monosaccharide, or oligosaccharide, or polysaccharide moiety, or a straight or branched alkyl group up to 18 carbons, or a hydroxyl-containing or an aldehyde-containing alkyl group; $R_9$ is a straight chain or branched alkyl group containing up to 12 carbons, preferably —CH$_2$CH$_2$—; $R_{11}$ is —R$_1$, —OR$_1$, —NR$_1$R$_4$, preferably —NH$_2$; $R_7$, $R_8$, S, and Z, identically or differently are —R$_9$N(R$_{10}$)$_2$, —R$_2$N$^+$(R$_3$)$_2$R$_4$X$^-$, —CH$_2$CH(OH)CH$_2$OR$_4$, —Y—R$_3$—COOH, —Y—R$_5$—COR$_{11}$, or —CH(OH)R$_6$; k, j, m$_1$, m$_2$, n$_1$, n$_2$, n$_3$, n$_4$, n$_5$, p, q, g and h, are non-negative numbers from 0 to 100 indicating mole percent of randomly distributed repeating units of formulae (I), (II), (III), (IV), (V), (VI), (VII), (VIII), (IX), (X), (XII), (XIII) or (XIV) present in said polymer, wherein k, j, m$_1$, m$_2$, n$_1$, n$_2$, n$_3$, n$_4$, n$_5$, p, q, g and h independently may be 0 mole percent; and the sum of m$_1$, m$_2$, n$_1$, n$_2$, n$_3$, n$_4$, n$_5$, g and h is larger than 0.1 mole percent. The present invention does not encompass an ethoxylated polymer when m$_2$ is more than 0.1 mole percent and m$_1$, n$_1$, n$_2$ n$_3$, and n$_4$ are 0 mole percent. The dashed lines represent the bonds connecting the repeating units within the backbone of the polymer.

Another embodiment of the present invention is a polymer having the following formula (XI):

(XI)

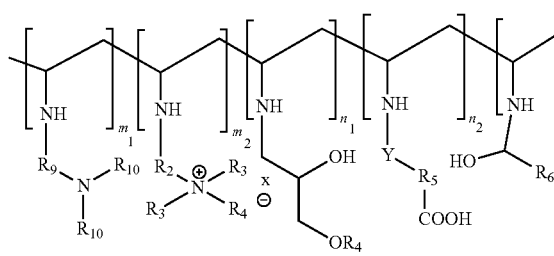 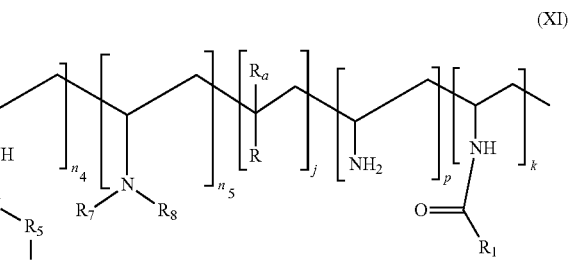

wherein, the sum of $m_1$, $m_2$, $n_1$, $n_2$, $n_3$, $n_4$, and $n_5$ is larger than 0.1 mole percent.

In one embodiment of the invention the sum of k, j, $m_1$, $m_2$, $n_1$, $n_2$, $n_3$, $n_4$, $n_5$ and p is 100 mole percent.

Another embodiment of the invention is a process for preparing the modified vinylamine-containing polymers, comprising the step of reacting a vinylamine-containing polymer for a period of time at a reaction temperature with a compound selected from the group consisting of an alkylating agent containing a cationic functional group and an amine-reactive functional group; an alkylating or acylating agent containing an amine-reactive functional group and that has or generates a carboxylic acid or an amide or an amide derivative moiety after acylation or alkylation; an alkyl glycidyl ether, an aldehyde-containing compound, such as a monosaccharide or oligosaccharide, and mixtures thereof; wherein the resulting polymer is optionally further reacted for a period of time at a reaction temperature with a compound selected from the group consisting of an alkylating agent containing a cationic functional group and an amine-reactive functional group; an alkylating or acylating agent containing an amine-reactive functional group and that has or generates a carboxylic acid or an amide or an amide derivative moiety after acylation or alkylation; an alkyl glycidyl ether, an aldehyde-containing compound, such as a monosaccharide or oligosaccharide, and mixtures thereof.

Yet another embodiment of the present invention is a composition comprising the modified vinylamine-containing polymers, wherein the composition is selected from the group consisting of dry strength resins for paper products; wet strength resins for paper products; adhesives; creping adhesives; drainage aids for papermaking; retention aids for papermaking; flocculants for water treatment; coagulants for water treatment; deposit control agents for papermaking process; stickies deposit control agent for use in papermaking application and water treatment; plasticizers for optimizing resin properties, and modifiers for optimizing resin properties.

Yet another embodiment of the present invention is a paper product comprising the modified vinylamine-containing polymers.

DETAILED DESCRIPTION OF THE INVENTION

As used herein, the singular terms "a" and "the" are synonymous and used interchangeably with "one or more" or "at least one" unless the context clearly indicates a contrary meaning. Accordingly, for example, reference to "a compound" herein or in the appended claims can refer to a single compound or more than one compound. Additionally, all numerical values, unless otherwise specifically noted, are understood to be modified by the word "about."

One aspect of the present invention is directed to vinylamine-containing polymers wherein the amine groups are substituted with (1) cationic moieties, (2) carboxylic acid-containing moieties, (3) alkyl glycidyl ether moieties, (4) monosaccharide or oligosaccharide moieties, or (5) combinations thereof.

As used herein and unless otherwise stated, the terms "vinylamine-containing polymers," is understood to mean homopolymers of vinylamine (e.g., polyvinylamine or fully hydrolyzed polyvinylformamide), copolymers of vinylamine with other comonomers, partially hydrolyzed polyvinylformamide, partially hydrolyzed vinylformamide copolymers, vinylamine terpolymers, vinylamine homo- and copolymers manufactured by the Hofmann modification of acrylamide polymers.

The present invention is based upon modification of vinylamine containing polymers that are chemically modified after polymerization. The present invention modifies vinylamine-containing polymers by subjecting them to post-polymerization chemical modification. Formula (IX) is a vinylamine moiety in a vinylamine-containing polymer that can be modified to produce one or more of formulae (I), (II), (III), (IV), (V), (VI), or (VII), in the polymer of the present invention. Partially hydrolyzed vinylformamide can contain formula (XII) in addition to Formula (IX). When formula (XII) is modified according to the present invention, it can produce formulae (XIII) or (XIV) or both in the polymer of the present invention.

One embodiment of the present invention is a polymer comprising randomly distributed repeating monomer units having at least one two of the formulae (I), (II), (III), (IV), (V), (VI), (VII), (XIII), or (XIV):

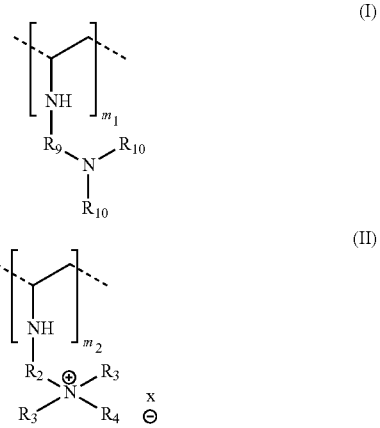

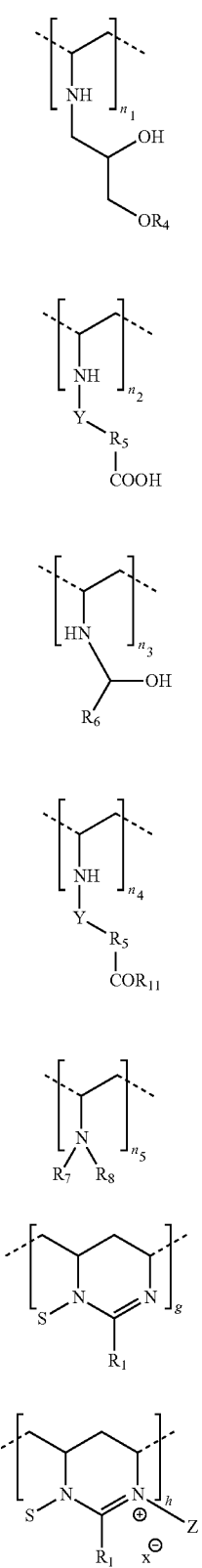
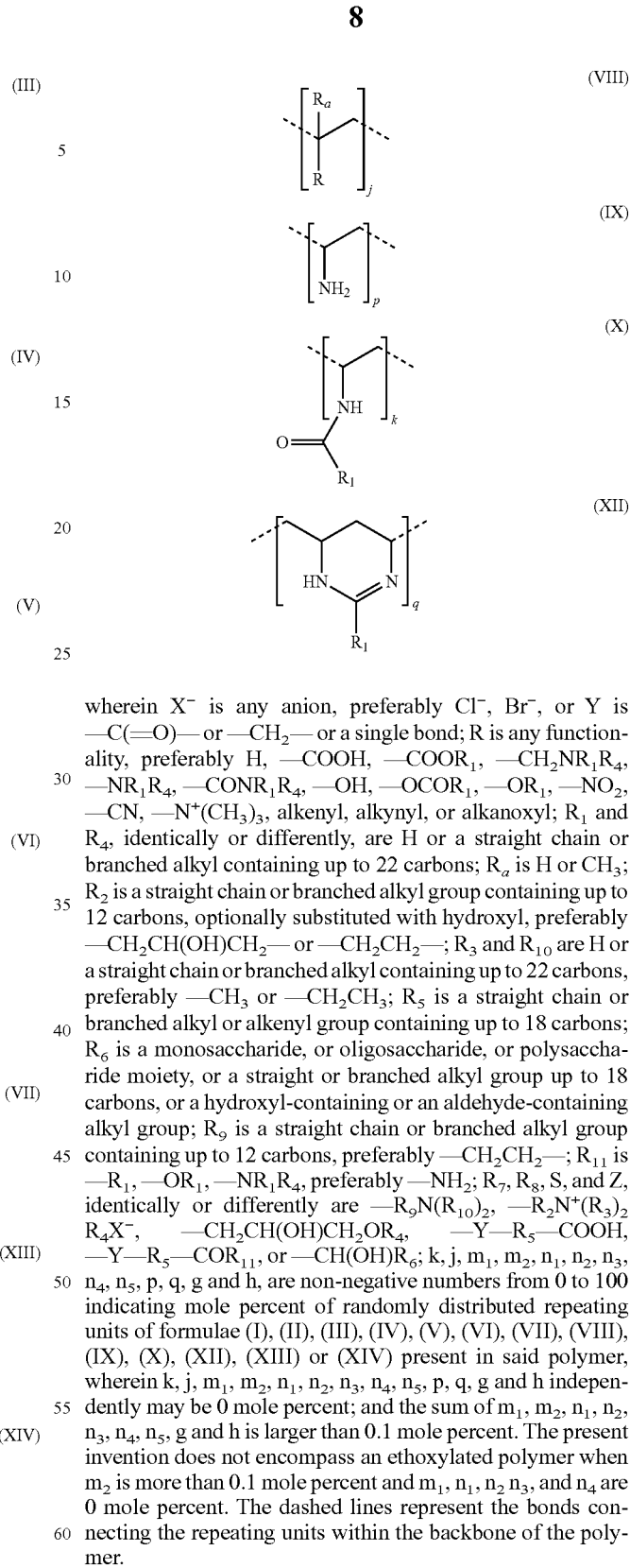

said polymer optionally further comprising randomly distributed repeating monomer units having at least one of the formulae (VIII), (IX), (X), or (XII):

wherein $X^-$ is any anion, preferably $Cl^-$, $Br^-$, or Y is —C(=O)— or —$CH_2$— or a single bond; R is any functionality, preferably H, —COOH, —$COOR_1$, —$CH_2NR_1R_4$, —$NR_1R_4$, —$CONR_1R_4$, —OH, —$OCOR_1$, —$OR_1$, —$NO_2$, —CN, —$N^+(CH_3)_3$, alkenyl, alkynyl, or alkanoxyl; $R_1$ and $R_4$, identically or differently, are H or a straight chain or branched alkyl containing up to 22 carbons; $R_a$ is H or $CH_3$; $R_2$ is a straight chain or branched alkyl group containing up to 12 carbons, optionally substituted with hydroxyl, preferably —$CH_2CH(OH)CH_2$— or —$CH_2CH_2$—; $R_3$ and $R_{10}$ are H or a straight chain or branched alkyl containing up to 22 carbons, preferably —$CH_3$ or —$CH_2CH_3$; $R_5$ is a straight chain or branched alkyl or alkenyl group containing up to 18 carbons; $R_6$ is a monosaccharide, or oligosaccharide, or polysaccharide moiety, or a straight or branched alkyl group up to 18 carbons, or a hydroxyl-containing or an aldehyde-containing alkyl group; $R_9$ is a straight chain or branched alkyl group containing up to 12 carbons, preferably —$CH_2CH_2$—; $R_{11}$ is —$R_1$, —$OR_1$, —$NR_1R_4$, preferably —$NH_2$; $R_7$, $R_8$, S, and Z, identically or differently are —$R_9N(R_{10})_2$, —$R_2N^+(R_3)_2R_4X^-$, —$CH_2CH(OH)CH_2OR_4$, —Y—$R_5$—COOH, —Y—$R_5$—$COR_{11}$, or —CH(OH)$R_6$; k, j, $m_1$, $m_2$, $n_1$, $n_2$, $n_3$, $n_4$, $n_5$, p, q, g and h, are non-negative numbers from 0 to 100 indicating mole percent of randomly distributed repeating units of formulae (I), (II), (III), (IV), (V), (VI), (VII), (VIII), (IX), (X), (XII), (XIII) or (XIV) present in said polymer, wherein k, j, $m_1$, $m_2$, $n_1$, $n_2$, $n_3$, $n_4$, $n_5$, p, q, g and h independently may be 0 mole percent; and the sum of $m_1$, $m_2$, $n_1$, $n_2$, $n_3$, $n_4$, $n_5$, g and h is larger than 0.1 mole percent. The present invention does not encompass an ethoxylated polymer when $m_2$ is more than 0.1 mole percent and $m_1$, $n_1$, $n_2$ $n_3$, and $n_4$ are 0 mole percent. The dashed lines represent the bonds connecting the repeating units within the backbone of the polymer.

In addition to primary amine moieties, partially hydrolyzed polyvinylformamide and vinylamine copolymers typically comprise randomly distributed amidine functional groups having the general formula (XII). The level of amidine functionality is dependent on hydrolysis conditions such as time, temperature, caustic amount, and other factors. Persons of ordinary skill in the art will understand that the alkylation and acylation of primary amine functionality to give the randomly distributed repeating monomer units of formulae (I), (II), (III), (IV), (V), (VI) and (VIII) can also occur on the nitrogen atoms of the amidine functional groups, resulting in randomly distributed monomer units of formulae (XIII) and (XIV):

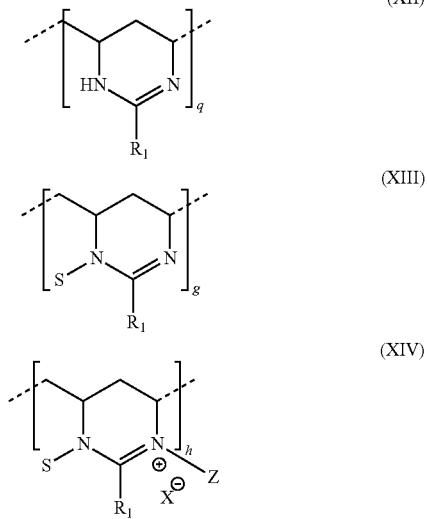

wherein q and g, independently are 0 or greater than 1, 2, 5, 10, 20, or 30 mole percent, and can be up to 99, or 90 or 80 or 70 mole percent, wherein h is 0 or greater than 0.5, or 1, or 2, or 5 mole percent, and can be up to 50, or 40 or 30 mole percent.

The polymer of the present invention can comprise repeating units of formula (XI), (XIII) and/or (XIV).

The polymers of the present invention comprise randomly distributed one, or any combination of two, or more of the repeating monomer units selected from formulae (I), (II), (III), (IV), (V), (VI), (VII), (XIII), or (XIV).

The present invention does not encompass an ethoxylated polymer when $m_2$ is more than 0.1 mole percent and $m_1$, $n_1$, $n_2$, $n_3$ and $n_4$ are 0 mole percent.

The dashed lines in the formulae represent the bonds connecting said repeating units within the backbone of said polymer.

Preferred polymers of the present invention comprise the formula (XI):

or any of those numbers in any combinations of two and more than two numbers is larger than 0.1 mole percent.

In one embodiment of the invention the sum of k, j, $m_1$, $m_2$, $n_1$, $n_2$, $n_3$, $n_4$, $n_5$, p, q, g and h, is 100 mole percent.

One embodiment of the present invention is a polymer that comprises randomly distributed repeating units of formula (I), wherein a vinylamine-containing polymer is cationized by an alkylating agent that has a tertiary amine group. In this embodiment, $m_2$, $n_1$, $n_2$, $n_3$, and $n_4$ are preferably 0 mole percent; $R_1$ is H or a straight chain or branched alkyl containing 4 to 8 carbons, more preferably H; $R_9$ is —$CH_2CH_2$—; $R_{10}$ is —$CH_2CH_3$; $m_1$ is in the range of from 0.1, 1, 2, 3 or 5 mole percent to 60, 70, 80, 90 or 100 mole percent; preferably from 0.1 to 100 mole percent, more preferably in the range of from 1 to 90 mole percent, more preferably in the range of from 2 to 80 mole percent, more preferably in the range of from 3 to 70 mole percent, more preferably in the range of from 5 to 60 mole percent.

One embodiment of the present invention is a polymer that comprises randomly distributed repeating units of formula (II), wherein a vinylamine-containing polymer is cationized by an alkylating agent that has a quaternary ammonium group. In this embodiment, $m_1$, $n_1$, $n_2$, $n_3$, and $n_4$ are preferably 0 mole percent; $X^-$ is any anion, preferably $Cl^-$; $R_1$ is H or a straight chain or branched alkyl containing 4 to 8 carbons, more preferably H; $R_2$ is —$CH_2CH(OH)CH_2$—; $R_3$ is —$CH_3$; $R_4$ is —$CH_3$ or a straight or branched alkyl group up to 18 carbons; $m_2$ is in the range of from 0.1, 1, 2 or 5 mole percent to 80, 85, 90 or 100 mole percent; preferably from 0.1 to 100 mole percent, more preferably in the range of from 1 to 90 mole percent, more preferably in the range of from 2 to 85 mole percent, more preferably in the range of from 5 to 80 mole percent.

One embodiment of the present invention is a polymer that comprises randomly distributed repeating units of formula (I) and formula (II), wherein a vinylamine-containing polymer is cationized by alkylating agents that have a tertiary amine group and that have a quaternary ammonium group. In this embodiment, $n_1$, $n_2$, $n_3$, and $n_4$ are preferably 0 mole percent; $X^-$ is any anion, preferably $Cl^-$; $R_1$ is H or a straight chain or branched alkyl containing 4 to 8 carbons, more preferably H; $R_2$ is —$CH_2CH(OH)CH_2$—; $R_3$ and $R_{10}$ is —$CH_3$ or —$CH_2CH_3$; $R_9$ is —$CH_2CH_2$—; $R_4$ is —$CH_3$ or a straight or branched alkyl group up to 18 carbons; the sum of $m_1$ and $m_2$ are in the range of from 0.1, 1, 2 or 5 mole percent to 80, 85, 90 or 100 mole percent; preferably from 0.1 to 100 mole percent, more preferably in the range of from 1 to 90 mole percent, more preferably in the range of from 2 to 85 mole percent, more preferably in the range of from 5 to 80 mole percent.

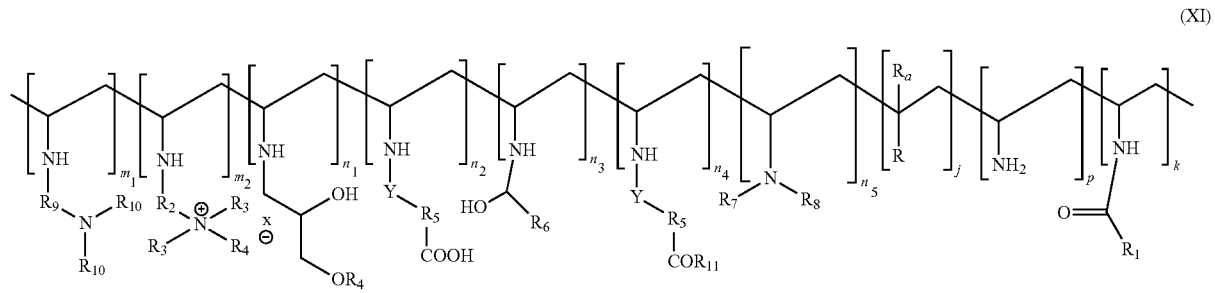

wherein the sum of $m_1$, $m_2$, $n_1$, $n_2$, $n_3$, $n_4$, and $n_5$ is larger than 0.1 mole percent, any number of $m_1$, $m_2$, $n_1$, $n_2$, $n_3$, $n_4$, and $n_5$, One embodiment of the present invention is a polymer that comprises randomly distributed repeating units of formula (V), wherein a vinylamine-containing polymer is alkylated by an aldehyde-containing agent. In this embodiment, $m_1$, $m_2$, $n_1$, $n_2$, and $n_4$ are preferably 0 mole percent; $R_6$ is a monosaccharide, or oligosaccharide, or polysaccharide moiety, or a straight or branched alkyl group up to 18 carbons, or a hydroxyl-containing or an aldehyde-containing alkyl group; $n_3$ is in the range of from 0.1, 1, 2 or 5 mole percent to 80, 85, 90 or 100 mole percent; preferably from 0.1 to 100 mole percent, more preferably in the range of from 1 to 90 mole percent, more preferably in the range of from 2 to 85 mole percent, more preferably in the range of from 5 to 80 mole percent.

One embodiment of the present invention is a polymer that comprises randomly distributed repeating units of formula (II) and (V), wherein a vinylamine-containing polymer is cationized by an alkylating agent that has a quaternary ammonium group and also alkylated by an aldehyde-containing agent. In this embodiment $m_1$, $n_1$, $n_2$, and $n_4$ are preferably 0 mole percent; $X^-$ is any anion, preferably $Cl^-$; $R_1$ is H or a straight chain or branched alkyl containing 4 to 8 carbons, more preferably H; $R_2$ is $—CH_2CH(OH)CH_2—$; $R_3$ is $—CH_3$; $R_4$ is $—CH_3$ or a straight or branched alkyl group up to 18 carbons; $R_6$ is a monosaccharide, or oligosaccharide, or polysaccharide moiety, or a straight or branched alkyl group up to 18 carbons, or a hydroxyl-containing or an aldehyde-containing alkyl group; $m_2$ is in the range of from 0.1, 1, 2, 3 or 5 mole percent to 50, 70, 80, 90 or 99.8 mole percent; preferably from 0.1 to 99.8 mole percent, more preferably in the range of from 1 to 90 mole percent, more preferably in the range of from 2 to 80 mole percent, more preferably in the range of from 3 to 70 mole percent, more preferably in the range of from 5 to 50 mole percent; $n_3$ is in the range of from 0.1, 1, 2, 3 or 5 mole percent to 20, 25, 30, 40, 50 or 99.8 mole percent; preferably from 0.1 to 99.8 mole percent, more preferably in the range of from 1 to 50 mole percent, more preferably in the range of from 1 to 40 mole percent, more preferably in the range of from 2 to 30 mole percent, more preferably in the range of from 3 to 25 mole percent, more preferably in the range of from 5 to 20 mole percent.

One embodiment of the present invention is a polymer that comprises randomly distributed repeating units of formula (III), wherein a vinylamine-containing polymer is alkylated by a glycidyl ether. In this embodiment, $m_1$, $m_2$, $n_2$, $n_3$, and $n_4$ are preferably 0 mole percent; $R_1$ is H or a straight chain or branched alkyl containing 4 to 8 carbons, more preferably H; $R_4$ is H or a straight chain or branched alkyl containing up to 22 carbons; more preferably H or a straight chain or branched alkyl containing 4-16 carbons; $n_1$ is in the range of from 0.1, 1, 2, 3 or 5 mole percent to 60, 70, 80, 90 or 100 mole percent; preferably from 0.1 to 100 mole percent, more preferably in the range of from 1 to 90 mole percent, more preferably in the range of from 2 to 80 mole percent, more preferably in the range of from 3 to 70 mole percent, more preferably in the range of from 5 to 60 mole percent.

One embodiment of the present invention is a polymer that comprises randomly distributed repeating units of formula (IV) where a vinylamine-containing polymer is alkylated by an alkylating agent that has a carboxylic acid or acylated by an acylating agent that generates a carboxylic acid after acylation. In this embodiment, $m_1$, $m_2$, $n_1$, $n_3$, and $n_4$ are preferably 0 mole percent; $R_1$ is H or a straight chain or branched alkyl containing 4 to 8 carbons, more preferably H; Y is $—C(=O)—$ or $—CH_2—$ or a single bond; more preferably $—C(=O)—$; $R_5$ is a straight chain or branched alkyl or alkenyl group containing up to 18 carbons; more preferably $—CH_2CH_2—$ or $—CH=CH—$; $n_2$ is in the range of from 0.1, 1, 2, 3 or 5 mole percent to 60, 70, 80, 90 or 100 mole percent; preferably from 0.1 to 100 mole percent, more preferably in the range of from 1 to 90 mole percent, more preferably in the range of from 2 to 80 mole percent, more preferably in the range of from 3 to 70 mole percent, more preferably in the range of from 5 to 60 mole percent.

One embodiment of the present invention is a polymer that comprises randomly distributed repeating units of formulae (III) and (IV), wherein a vinylamine-containing polymer is alkylated by glycidyl ether and also alkylated by an alkylating agent that has a carboxylic acid or acylated by an acylating agent that generates a carboxylic acid group after acylation. In this embodiment, $m_1$, $m_2$, $n_3$, and $n_4$ are preferably 0 mole percent; $R_1$ is H or a straight chain or branched alkyl containing 4 to 8 carbons, more preferably H; $R_4$ is H or a straight chain or branched alkyl containing up to 22 carbons; more preferably H or a straight chain or branched alkyl containing 4-16 carbons; Y is $—C(=O)—$ or $—CH_2—$ or a single bond; more preferably $—C(=O)—$; $R_5$ is a straight chain or branched alkyl or alkenyl group containing up to 18 carbons; more preferably $—CH_2CH_2—$ or $—CH=CH—$; $n_1$ is in the range of from 0.1, 1, 2, 3, 4 or 5 mole percent to 40, 60, 70, 80, 90 or 99.9 mole percent; preferably from 0.1 to 99.9 mole percent, more preferably in the range of from 1 to 90 mole percent, more preferably in the range of from 2 to 80 mole percent, more preferably in the range of from 3 to 70 mole percent, more preferably in the range of from 4 to 60 mole percent, more preferably in the range of from 5 to 40 mole percent; $n_2$ is in the range of from 0.1, 1, 2, 3, 4 or 5 mole percent to 40, 60, 70, 80, 90 or 99.9 mole percent; preferably in the range of from 0.1 to 99.9 mole percent, more preferably in the range of from 1 to 90 mole percent, more preferably in the range of from 2 to 80 mole percent, more preferably in the range of from 3 to 70 mole percent, more preferably in the range of from 4 to 60 mole percent, more preferably in the range of from 5 to 40 mole percent.

One embodiment of the present invention is a polymer that comprises randomly distributed repeating units of formula (II) and (IV), wherein a vinylamine-containing polymer is cationized by an alkylating agent that has a quaternary ammonium group and also alkylated by an alkylating agent that has or generates a carboxylic acid moiety or acylated by an acylating agent that has or generates a carboxylic acid moiety after acylation. In this embodiment $m_1$, $n_1$, $n_3$, and $n_4$ are preferably 0 mole percent; $X^-$ is any anion, preferably $Cl^-$; $R_1$ is H or a straight chain or branched alkyl containing 4 to 8 carbons, more preferably H; $R_2$ is $—CH_2CH(OH)CH_2—$; $R_3$ is $—CH_3$; $R_4$ is $—CH_3$ or a straight or branched alkyl group up to 18 carbons; Y is $—C(=O)—$ or $—CH_2—$ or a single bond; more preferably $—C(=O)—$; $R_5$ is a straight chain or branched alkyl or alkenyl group containing up to 18 carbons; more preferably $—CH_2CH_2—$ or $—CH=CH—$; $m_2$ is in the range of from 0.1, 1, 2, 3 or 5 mole percent to 60, 70, 80, 90 or 99.8 mole percent; preferably from 0.1 to 99.8 mole percent, more preferably in the range of from 1 to 90 mole percent, more preferably in the range of from 2 to 80 mole percent, more preferably in the range of from 3 to 70 mole percent, more preferably in the range of from 5 to 60 mole percent; $n_2$ is in the range of from 0.1, 1 or 2 mole percent to 20, 30, 40 or 50 mole percent; preferably from 0.1 to 50 mole percent, more preferably in the range of from 1 to 40 mole percent, more preferably in the range of from 2 to 30 mole percent, more preferably in the range of from 2 to 20 mole percent; p is in the range of from 0.1, 0.5, 1, 2, 5, 10 or 20 mole percent to 60, 70, 75, 80, 90, 95, or 99.8 mole percent; preferably from 0.1 to 99.8 mole percent, preferably from 0.5 to 95 mole percent, more preferably in the range of from 1 to 90 mole percent, more preferably in the range of from 2 to 80 mole percent, more preferably in the range of from 5 to 75 mole percent, more preferably in the range of from 10 to 70 mole percent, more preferably in the range of from 20 to 60 mole percent.

One embodiment of the present invention is a polymer that comprises randomly distributed repeating units of formula (II) and (VI), wherein a vinylamine-containing polymer is cationized by an alkylating agent that has a quaternary ammonium group and also alkylated by an alkylating agent that has an amide or an amide derivative moiety. In this embodiment $m_1$, $n_1$, $n_2$, and $n_3$ are preferably 0 mole percent; $X^-$ is any anion, preferably $Cl^-$; $R_1$ is H or a straight chain or branched alkyl containing 4 to 8 carbons, more preferably H; $R_2$ is —$CH_2CH(OH)CH_2$—; $R_3$ is —$CH_3$; $R_4$ is —$CH_3$ or a straight or branched alkyl group up to 18 carbons; Y is —C(=O)— or —$CH_2$— or a single bond; more preferably a single bond; $R_5$ is a straight chain or branched alkyl or alkenyl group containing up to 18 carbons; more preferably —$CH_2$—; $R_{11}$ is —$R_1$, —$OR_1$, —$NR_1R_4$, more preferably —$NH_2$; $m_2$ is in the range of from 0.1, 1, 2, 3 or 5 mole percent to 60, 70, 80, 90 or 99.8 mole percent; preferably from 0.1 to 99.8 mole percent, more preferably in the range of from 1 to 90 mole percent, more preferably in the range of from 2 to 80 mole percent, more preferably in the range of from 3 to 70 mole percent, more preferably in the range of from 5 to 60 mole percent; $n_4$ is in the range of from 0.1, 1 or 2 mole percent to 20, 30, 40 or 50 mole percent; preferably from 0.1 to 50 mole percent, more preferably in the range of from 1 to 40 mole percent, more preferably in the range of from 2 to 30 mole percent, more preferably in the range of from 2 to 20 mole percent; p is in the range of from 0.1, 1, 2, 5, 10 or 20 mole percent to 60, 70, 75, 80, 90 or 95 mole percent; preferably from 0.1 to 95 mole percent, more preferably in the range of from 1 to 90 mole percent, more preferably in the range of from 2 to 80 mole percent, more preferably in the range of from 5 to 75 mole percent, more preferably in the range of from 10 to 70 mole percent, more preferably in the range of from 20 to 60 mole percent.

One embodiment of the present invention is a polymer that comprises randomly distributed repeating units of formula (II) and (III), wherein a vinylamine-containing polymer is cationized by an alkylating agent that has a quaternary ammonium group and also alkylated by a glycidyl ether. In this embodiment $m_1$, $n_2$, $n_3$, and $n_4$ are preferably 0 mole percent; $X^-$ is any anion, preferably $Cl^-$; $R_1$ is H or a straight chain or branched alkyl containing 4 to 8 carbons, more preferably H; $R_2$ is —$CH_2CH(OH)CH_2$—; $R_3$ is —$CH_3$; $R_4$ is H or a straight chain or branched alkyl containing up to 22 carbons; more preferably H or a straight chain or branched alkyl containing 4-16 carbons; $m_2$ is in the range of from 0.1, 1, 2, 3 or 5 mole percent to 50, 70, 80, 90 or 99.8 mole percent; preferably from 0.1 to 99.8 mole percent, more preferably in the range of from 1 to 90 mole percent, more preferably in the range of from 2 to 80 mole percent, more preferably in the range of from 3 to 70 mole percent, more preferably in the range of from 5 to 50 mole percent; $n_1$ is in the range of from 0.1, 1, 2, 3 or 5 mole percent to 20, 25, 30, 40 or 50 mole percent; preferably from 0.1 to 50 mole percent, more preferably in the range of from 1 to 40 mole percent, more preferably in the range of from 2 to 30 mole percent, more preferably in the range of from 3 to 25 mole percent, more preferably in the range of from 5 to 20 mole percent; p is in the range of from 0.1, 0.5, 1, 2, 5, 10 or 20 mole percent to 60, 70, 75, 80, 90, 95 or 99.8 mole percent; preferably from 0.1 to 99.8 mole percent, preferably from 0.1 to 95 mole percent, more preferably in the range of from 1 to 90 mole percent, more preferably in the range of from 2 to 80 mole percent, more preferably in the range of from 5 to 75 mole percent, more preferably in the range of from 10 to 70 mole percent, more preferably in the range of from 20 to 60 mole percent.

Another embodiment of the present invention is a polymer that comprises randomly distributed any combination of two, or more of the repeating monomer units selected from formulae (I), (II), (III), (IV), (V), (VI), (VII), (XIII), or (XIV). In this embodiment, any of $m_1$, $m_2$, $n_1$, $n_2$, $n_3$, $n_4$, $n_5$, g and h, in any combination of two or more is larger than 0.1 mole percent. One embodiment of the invention has three or more of the randomly distributed monomer units. One embodiment of the invention has four or more of the randomly distributed monomer units.

Another embodiment of the present invention is a polymer, wherein 1 is 0 mole percent and the polymer has a molecular weight in the range of from about 4,000 to about 2,000,000 Daltons, more preferably in the range of from about 10,000 to about 1,000,000 Daltons.

Another embodiment is a process for preparing the modified vinylamine-containing polymers, comprising the step of reacting a vinylamine-containing polymer, preferably in solution, for a period of time at a reaction temperature with a compound selected from the group consisting of an alkylating agent containing a cationic functional group and an amine-reactive functional group; an alkylating or acylating agent containing an amine-reactive functional group and that has or generates a carboxylic acid or an amide or an amide derivative moiety after acylation or alkylation; an alkyl glycidyl ether, an aldehyde-containing compound, such as a monosaccharide or oligosaccharide, and mixtures thereof; wherein the resulting polymer is optionally further reacted for a period of time at a reaction temperature with a compound selected from the group consisting of an alkylating agent containing a cationic functional group and an amine-reactive functional group; an alkylating or acylating agent containing an amine-reactive functional group and that has or generates a carboxylic acid or an amide or an amide derivative moiety after acylation or alkylation; an alkyl glycidyl ether, an aldehyde-containing compound, such as a monosaccharide or oligosaccharide, and mixtures thereof.

Another embodiment of the present invention is the aforementioned process, wherein said vinylamine-containing polymer is present in said reaction medium in an amount of from about 1% to about 50% solids.

Another embodiment of the present invention is the aforementioned process, wherein said reaction medium comprises water or an organic solvent.

Another embodiment of the present invention is the aforementioned process, wherein said reaction temperature is from about 10° C. to about 90° C.

Another embodiment of the present invention is the aforementioned process, wherein said time period is from about 15 minutes to about 12 hours.

Additionally, persons of ordinary skill in the art will understand that the alkylation and acylation of primary amine functionality to give the randomly distributed repeating monomer units of formulae (I), (II), (III), (IV), (V), (VI), (VII), (XIII), or (XIV), can also occur on the nitrogen atoms of amine-containing comonomers or functional groups generated during the manufacture of vinylamine copolymers. For example, the nitrogen atoms of functional groups generated during the hydrolysis of copolymers of vinylformamide with acrylamide and acrylonitrile can be alkylated or acylated with an agent containing an amine-reactive functional group that has or generates a carboxylic acid or an amide or an amide derivative moiety after acylation or alkylation and/or an alkylating agent containing a cationic group and an amine-reactive functional group and/or an alkyl glycidyl ether and/or an aldehyde-containing compound, such as a monosaccharide or oligosaccharide, and mixtures thereof.

Alkylation or acylation of vinylamine-containing polymers with an agent containing an amine-reactive functional group and that has or generates a carboxylic acid or an amide or an amide derivative moiety after acylation or alkylation can be performed before or after alkylation with an alkylating agent containing a cationic group and an amine-reactive functional group or an alkyl glycidyl ether or an aldehyde-containing compound, such as a monosaccharide or oligosaccharide, and mixtures thereof. The alkylation of vinylamine-containing polymers with both an alkylating agent containing a cationic group and an amine-reactive functional group and an alkyl glycidyl ether can be performed at the same time or sequentially. The polymers of the present invention can be obtained with or without purification. The process of the present invention can be used to append a wide variety of functional groups to the vinylamine-containing polymer, including those that do not impart anionic or cationic functionality or amphoteric character to the polymer.

Alkylation of vinylamine-containing polymers can be performed with an agent containing an aldehyde functional group such as acetaldehyde, propionaldehyde, butylaldehyde, glyoxal or a monosaccharide or oligosaccharide that has an aldehyde reducing end. Without wishing to be bound by theory, Reaction of vinylamine with a reducing end-containing monosaccharide or oligosaccharide initially forms a hemi-aminal, as shown in structure (V). Further reaction (dehydration) can form an imine functional group (XV) that may further react with another amine to form an aminal functional group (XVI). The reducing end-containing monosaccharide or oligosaccharide used in the processes of the present invention is preferably selected from the group consisting of glucose, maltose, lactose, maltodextrin, corn syrup, enzymatically hydrolyzed starches and chemically hydrolyzed starches. The reducing end-containing monosaccharide or oligosaccharide used in the processes of the present invention is most preferably corn syrup and lactose. In general, a reducing end-containing monosaccharide or oligosaccharide is added as a powder or an aqueous solution to an aqueous solution of vinylamine-containing polymer at a temperature in the range of from 20° C. to 50° C. at pH in the range of from 6.0 to 12.0 over a time period of about 5 to 30 minutes. The reaction is conducted at a pH in the range of from 6, 8, 9 or 10 to 11, 11.5, 12 or 12.5; preferably from 6 to 12.5; preferably from 8.0 to 12.0, more preferably from 9.0 to 11.5, and most preferably from 10.0 to 11.0. The alkylation is conducted for a time period in the range of from 5, 10, 15, 20, or 30 minutes to 1, 3, 4, 5, 12, or 15 hours; preferably 5 minutes to 15 hours, more preferably from 15 minutes to 12 hours, more preferably from 10 minutes to 8 hours, more preferably from 15 minutes to 6 hours, more preferably from 20 minutes to 4 hours, and most preferably from 30 minutes to 2 hours. Without wishing to be bound by theory, the linkage of the saccharides and vinylamine moiety is a hemi-aminal (V) or an imine (XV). It is relatively stable under alkaline condition but is less stable under acidic conditions. It can react with an amine from another polyvinylamine molecule to form an aminal group and crosslink the polymer. The imine group can also react with the adjacent amine to form a six-member ring aminal functional group (XVI). This alkylation is conducted with polymer content in the reaction medium in the range of from 1, 2, 5, or 10% solids to 30, 35, 40, or 50% solids; preferably from 1% to 50% solids, preferably from 2% to 40% solids, more preferably from 5% to 35% solids, and most preferably from 10% to 30% solids.

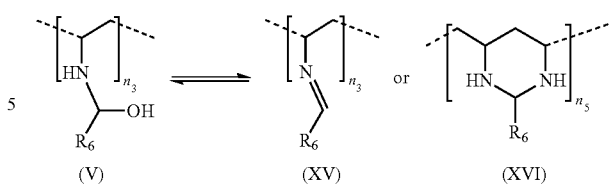

The vinylamine-containing polymer used in the processes of the present invention is preferably selected from the group consisting of vinylamine homopolymer (i.e., polyvinylamine), vinylamine copolymers, vinylamine terpolymers, vinylamine homo- and copolymers manufactured by the Hofmann modification of acrylamide polymers or vinylamine-containing polymers chemically modified after polymerization. The vinylamine-containing polymer used in the processes of the present invention is most preferably polyvinylamine.

Appending cationic functional group-containing substituents to the pendant amines of vinylamine-containing polymers increases the total weight of the resulting polymer, thereby increasing the molecular weight of the polymer, and also alters the cationic charge distribution of the resulting polymer. The alkylating agent containing a cationic functional group and an amine-reactive functional group used in the processes of the present invention is preferably selected from the group consisting of 3-chloro-2-hydroxypropyltrimethylammonium chloride and 2-(diethylamino)ethyl chloride. The alkylating agent containing a cationic functional group and an amine-reactive functional group used in the processes of the present invention is most preferably 3-chloro-2-hydroxypropyltrimethylammonium chloride.

Alkylation of vinylamine-containing polymers with an alkylating agent containing a cationic functional group and an amine-reactive functional group, for example 3-chloro-2-hydroxypropyltrimethylammonium chloride or 2-(diethylamino)ethyl chloride hydrochloride, is generally performed in water, but may also be performed in water/organic solvent mixtures. These alkylations may be conducted at a pH in the range of from 2, 4, 6, 8, 9, or 10 to 11.5, 12, 12.5, 13, or 14; preferably at a pH in the range of from 2 to 14, more preferably from 4 to 14, more preferably from 6 to 14, more preferably from 8 to 14, more preferably from 9 to 13, more preferably from 10.0 to 12.5, and most preferably from 11.5 to 12.0. These alkylations may be conducted at a temperature in the range of from 10, 20, 30, 40, or 50° C. to 60, 70, 80, 85, or 90° C.; preferably at a temperature in the range of from 10° C. to 90° C., more preferably from 20° C. to 85° C., more preferably from 30° C. to 80° C., more preferably from 40° C. to 70° C., and most preferably from 50° C. to 60° C. These alkylations may be conducted for a time period in the range of from 5, 10, 15, 20, 30, 40, or 60 minutes to 1, 2, 3, 4, 5, 10, 12, or 25 hours; preferably for a time period in the range of from 5 minutes to 25 hours, more preferably from 10 minutes to 10 hours, more preferably from 15 minutes to 5 hours, more preferably from 15 minutes to 12 hours, more preferably from 20 minutes to 4 hours, more preferably from 30 minutes to 3 hours, more preferably from 40 minutes to 2 hours, and is most preferably conducted in 1 hour. These alkylations may be conducted with polymer content in the reaction medium in the range of from 1, 3, 5, 8, or 10% to 20, 25, 30, 40, or 50% polymer solids in water; preferably conducted with polymer content in the reaction medium in the range of from 1% to 50%, more preferably from 3% to 40%, more preferably from 5% to 30%, more preferably from 8% to 25%, and most preferably from 10% to 20% polymer solids in water.

Without wishing to be bound by theory, a relatively wide range of reaction conditions are possible because the linkage between the 1-(N,N,N-trimethylammonium chloride)-2-hydroxypropyl and vinylamine moieties is relatively chemically stable under both alkaline and high temperature conditions.

Other alkylating agents containing a cationic functional group and an amine-reactive functional group may be used in the processes of the present invention, including (dialkylamino)alkyl chloride, e.g, 2-(dimethylamino)ethyl chloride, 3-chloro-2-hydroxypropyl-alkyl-dimethylammonium chloride, e.g., 3-chloro-2-hydroxypropyl-lauryl-dimethylammonium chloride, 3-chloro-2-hydroxypropyl-cocoalkyl-dimethylammonium chloride, 3-chloro-2-hydroxypropyl-stearyl-dimethylammonium chloride, (haloalkyl) trimethylammonium chloride, e.g., (4-chloroobutyl) trimethylammonium chloride, (6-chlorohexyl) trimethylammonium chloride, (8-chlorooctyl) trimethylammonium chloride, (glycidylpropyl) trimethylammonium chloride.

Other alkylating agents that may be used to further modify the present invention but do not produce the polymer of the present invention are: alkyl halide, e.g., methyl chloride, ethyl chloride, propyl chloride, butyl chloride, benzyl chloride, phenylethyl chloride.

Other alkylating agents include, but are not limited to olefins, e.g., 1-hexene, 1-nonene, 1-decene and 1-dodecene, cyclic olefins, e.g., cyclohexene, cyclopentene and cyclooctene, arylalkylenes, e.g., styrene, methyl styrene, 3-phenylpropene and 2-phenyl-2-butene.

Vinylamine-containing polymers can also be alkylated with alkyl glycidyl ether compounds, glycidol, or chloropropanediol. The alkyl glycidyl ether used in the processes of the present invention is preferably selected from the group consisting of butyl glycidyl ether, 2-ethylhexyl glycidyl ether, hexadecyl glycidyl ether, and C12/C14 glycidyl ethers. Alkylation of vinylamine-containing polymers with alkyl glycidyl ether is generally performed in water, but may also be performed in water/organic solvent mixtures. These alkylations may be conducted at a pH in the range of from 8, 9, 10, or 11.5 to 12, 12.5, 13, or 14; preferably from 8.0 to 14.0, more preferably from 9.0 to 13, more preferably from 10.0 to 12.5, and most preferably from 11.5 to 12.0. These alkylations may be conducted at a temperature in the range of from 10, 20, 30, 40, or 50° C. to 60, 70, 80, 85, or 90° C.; preferably from 10° C. to 90° C., more preferably from 20° C. to 85° C., more preferably from 30° C. to 80° C., more preferably from 40° C. to 70° C., and most preferably from 50° C. to 60° C. These alkylations may be conducted for a time period in the range of from 5, 10, 15, 20, 30, 40, or 60 minutes to 1, 2, 3, 4, 5, 10, 12, or 25 hours; preferably from 5 minutes to 25 hours, more preferably from 10 minutes to 10 hours, more preferably from 15 minutes to 5 hours, more preferably from 15 minutes to 12 hours, more preferably from 20 minutes to 4 hours, more preferably from 30 minutes to 3 hours, more preferably from 40 minutes to 2 hours, and most preferably for 1 hour. These alkylations may be conducted with polymer content in the reaction medium in the range of from 1, 3, 5, 8, or 10% to 20, 25, 30, 40 or 50%; preferably from 1% to 50%, more preferably from 3% to 40%, more preferably from 5% to 30%, more preferably from 8% to 25%, and most preferably from 10% to 20%.

The alkylating or acylating agent containing an amine-reactive functional group and that has or generates a carboxylic acid or an amide or an amide derivative moiety after acylation or alkylation used in the processes of the present invention is preferably selected from the group consisting of succinic anhydride, succinic anhydride substituted with a straight chain or branched alkyl or alkenyl group containing up to 18 carbons, maleic anhydride, glutaric anhydride, 3-methylglutaric anhydride, 2,2-dimethylsuccinic anhydride, cyclic alkyl carboxylic anhydrides, cyclic alkenyl carboxylic anhydrides, alkenyl succinic anhydride (ASA), chloroacetic acid, salts of chloroacetic acid, bromoacetic acid, salts of bromoacetic acid, halogen-substituted alkanic acid acrylamides, and halogen-substituted alkenoic acid acrylamides. Alkenyl succinic anhydride (ASA), which is a common sizing agent used in paper, may be prepared by the reaction of maleic anhydride with an olefin. The alkylating or acylating agent containing an amine-reactive functional group and that has or generates a carboxylic acid moiety after acylation or alkylation used in the processes of the present invention is most preferably succinic anhydride, or succinic anhydride substituted with a straight chain or branched alkyl or alkenyl group containing up to 18 carbons, or maleic anhydride. When cyclic carboxylic acid anhydrides, such as succinic or maleic anhydride, are reacted with a vinylamine-containing polymer, carboxylic acid-containing functional groups are appended onto the pendant amine groups of the vinylamine-containing polymer through ring opening acylation of the amine functionality. Appending a carboxylic acid-containing functional group onto vinylamine-containing polymers imparts these polymers with amphoteric properties.

Alkylation or acylation of vinylamine-containing polymers with alkylating or acylating agents containing an amine-reactive functional group and that has or generates a carboxylic acid or an amide or an amide derivative moiety after acylation or alkylation, such as succinic anhydride, is typically performed in water, but may also be performed in water/organic solvent mixtures. In general, such agents are added to an aqueous solution of vinylamine-containing polymer at a temperature in the range of from 20° C. to 50° C. at pH in the range of from 7.0 to 10.0 over a time period of about 20 to 30 minutes. The reaction is conducted at a pH in the range of from 6, 7, or 7.5 to 8.5, 9, or 10; preferably from 6.0 to 10.0, more preferably from 7.0 to 9.0, and most preferably from 7.5 to 8.5. These alkylations and acylations are conducted at a temperature in the range of from 10, 15, 20, or 30° C. to 50, 60, 70, or 90° C.; preferably from 10° C. to 90° C., more preferably from 10° C. to 70° C., more preferably from 15° C. to 60° C., more preferably from 20° C. to 50° C., and most preferably from 30° C. to 40° C. These alkylations and acylations are conducted for a time period in the range of from 5, 10, 15, 20, or 30 minutes to 1, 3, 4, 5, 12, or 15 hours; preferably 5 minutes to 15 hours, more preferably from 15 minutes to 12 hours, more preferably from 10 minutes to 5 hours, more preferably from 15 minutes to 4 hours, more preferably from 20 minutes to 3 hours, and most preferably from 30 minutes to 1 hour. Higher pH and temperature will increase reaction rate but may also increase the rate of hydrolysis of succinic anhydride, thus reducing reaction efficiency. The linkage of the alkyl carboxylic acid and vinylamine moiety is an amide. It is relatively stable under neutral and acidic condition but is less stable under alkaline conditions, being susceptible to gradual hydrolysis at pH higher than 9.0. These alkylations and acylations are conducted with polymer content in the reaction medium in the range of from 1, 2, 5, or 10% solids to 30, 35, 40, or 50% solids; preferably from 1% to 50% solids, preferably from 2% to 40% solids, more preferably from 5% to 35% solids, and most preferably from 10% to 30% solids.

Not wishing to be bound by theory, completely hydrolyzed vinylformamide theoretically consists only of vinylamine repeating units (i.e., vinylamine homopolymer), each vinylamine repeating unit possessing one primary amine and having a molecular weight of 43. Furthermore, all of the vinylamine repeating units in completely hydrolyzed vinylformamide can theoretically be (1) alkylated by an alkylating agent containing a cationic group and an amine-reactive functional group, (2) alkylated or acylated by an alkylating or acylating agent containing an amine-reactive functional group and that has or generates a carboxylic acid or an amide or an amide derivative after acylation or alkylation, (3) alkylated with an alkyl glycidyl ether, or (4) alkylated by a monosaccharide, or oligosaccharide or polysaccharide on a 1:1 molar basis. Thus, for example, if all the primary amines of polyvinylamine are acylated by succinic anhydride, the molar ratio is 1:1. When 3-chloro-2-hydroxypropyltrimethylammonium chloride is used as the alkylating agent containing a cationic group and an amine-reactive functional group, its molar ratio to vinylamine units is greater than 0.03, 0.05, 0.1, 0.2, 0.25, or 0.3, but less than 0.4, 0.5, 0.6, 0.7, 0.8 or 1.0; preferably greater than 0.03 but less than 1.0, preferably greater than 0.05 but less than 0.8, more preferably greater than 0.1 but less than 0.7, more preferably greater than 0.2 but less than 0.6, more preferably greater than 0.25 but less than 0.5, and most preferably greater than 0.3 but less than 0.4.

When vinylamine-containing polymer is acylated with succinic anhydride and alkylated with 3-chloro-2-hydroxypropyltrimethyl ammonium chloride, the molar ratio of succinic anhydride to vinylamine units is greater than 0.005, 0.01, 0.015, 0.02, or 0.03, but less than 0.2, 0.3, 0.5, 0.8, or 1.0; preferably greater than 0.005 but less than 1.0, preferably greater than 0.01 but less than 0.8, more preferably greater than 0.015 but less than 0.5, more preferably greater than 0.02 but less than 0.3, and most preferably greater than 0.03 but less than 0.2; while the molar ratio of 3-chloro-2-hydroxypropyltrimethylammonium chloride to vinylamine units is preferably greater than 0.02, 0.05, 0.1, 0.2, 0.25, or 0.3, but less than 0.4, 0.5, 0.6, 0.7, 0.8, or 1.0; preferably greater than 0.02 but less than 1.0, more preferably greater than 0.05 but less than 0.8, more preferably greater than 0.1 but less than 0.7, more preferably greater than 0.2 but less than 0.6, more preferably greater than 0.25 but less than 0.5, and most preferably greater than 0.3 but less than 0.4.

Without wishing to be bound by theory, the polymers of the present invention may undergo chemical self-crosslinking under various conditions, resulting in a change in physical and chemical properties that would ultimately affect application properties, such as bonding affinity to pulp fiber and interactions with other polymers etc. Typical examples for the self-crosslinking are the inter- and intra-molecular crosslinking of the maleic anhydride acylated polyvinylamine via Michael addition and the crosslinking of chloroacetamide alkylated polyvinylamine via the transamidation of the appended acetamide.

Any difunctional or multi-functional crosslinker can be used to crosslink the polymers of the present invention through a post treatment process. The examples of those difunctional or multi-functional crosslinkers are: alkyl diepoxide, 1,3-butadiene, polyepoxide, alkyl diglycidyl ether, trimethylolpropane triglycidyl ether, neopentyl glycol diglycidyl ether, diglycidyl 1,2-cyclohexanecarboxylate, dihaloalkane, dichloromethane, dichloroethane, 3-glycidoxypropyltrimethoxysilane, alkyl diisocyanate, polyisocyanate, maleic anhydride-based polymers, aziridine, epihalohydrin, tris(2,3-epoxypropyl) isocyanurate, 1,4 butanediol diglycidyl ether, glycerol triglycidyl ether, polyethylene glycol diglycidyl ether, dialdehydes, ethylene glycol diacrylate, methylenebisacrylamide, 1,4-butanediol diacrylate, bisphenol diacrylate, polyethylene glycol diacrylate, hexanediol diacrylate, 1,10-decanediol diacrylate, dicyclopentenyl acrylate, dicyclopentenyl methacrylate, polyethoxy methacrylatemethacrylate, phenylthioethyl acrylate, polyfunctional acrylamide, polyfunctional acrylates, polyfunctional methacrylates, polyfunctional maleates, polyfunctional fumarates, a metal halide, aluminum chloride, aluminum bromide, indium trichloride, gallium trichloride, tantalum pentachloride, titanium tetrachloride, boron trifluoride, boron trifluoride etherate, boron trichloride, and zirconium chloride. The polymers of the present invention may also undergo physical crosslinking via electrostatic interaction or hydrophobic interaction under various conditions and generate the polymers having different physical and application properties. The inorganic crosslinkers can be any anionic inorganic material with two or multi-anionic ion, such as boric acid, phosphoric acid, or sulfuric acid.

Another aspect of the present invention is directed the use of the polymers of the present invention in a variety papermaking, water treatment, and other applications. The capacity in which the polymers of the present invention can be used depends on the nature of the substituents appended to the pendant amine groups of the vinylamine-containing polymer, as well as the degree of substitution. Compositions comprising vinylamine-containing polymers comprising randomly distributed repeating units having the formulae (II), or (I) and (II), or (II) and (IV), or (II) and (V), or (II) and (VI), as defined above, may be used in papermaking as dry strength resins, wet strength resins, retention aids, drainage aids, and as pitch and stickies control agents, flocculants for water treatment, and coagulants for water treatment. Compositions comprising vinylamine-containing polymers comprising randomly distributed repeating units having the formula (II) and (III), or (I) and (II), or (V), as defined above, are particularly useful for contaminant control in papermaking processes and water treatment, such as cationic polymeric surfactants for pitch and stickies control, and as adhesives, particularly creping adhesives and building product adhesives. Compositions comprising the polymers of the present invention may be also used as plasticizers or modifiers for optimizing resin properties, viscosifiers, and coating materials for various other industrial applications. Paper products may also comprise the polymers of the present invention.

Enhanced removal and/or control of pitch and stickies in paper pulp stock can be achieved by treatment with a combination of the polymers of the present invention and one or more enzymes. Such enzymes typically include hydrolases, such as cellulases, hemicellulases, amylases, proteases, beta-glucosidases, lipases, esterases, and pectinases; lyases, such as pectate lyase; and oxidoreductases, such as laccase, glucose oxidase, and peroxidases. Enzymes can generally be used in any form, such as in liquid or solid form. Individual enzymes or any combinations of different enzymes may be applied together with the polymers of the present invention, or applied sequentially before or after the application of the polymers of the present invention. Individual enzymes may be blended together with the polymers of the present invention to form a blended composition prior to use.

Mixtures of enzymes and polymers of the present invention in any of the forms described above can be present in or introduced into a pulper during the pulping stage using any conventional pulping technique, such as mechanical pulping or chemical pulping for virgin fibers or recycled fiber treatments, or combinations thereof. Combinations of enzymes and polymers of the present invention of any form can be introduced or brought into contact at any stock storage chest or other holding tank. They can also be administered into the paper machine white water or, alternatively, can be applied in the water treatment loops of virgin or recycling mills to treat stickies or pitch in the water filtrates.

Not wishing to be bound by theory, the molecular weight of the polymers of the present invention is important for its use as a papermaking additive for strength improvement of paper products. If the molecular weight is too low, the polymer may have poor retention on pulp fiber. If the molecular weight is too high, the polymer tends to coagulate prior to binding with fiber, which reduces effectiveness of the polymer as a strength additive. The molecular weight ($M_w$) of the vinylamine-containing polymers used to prepare the polymers of the present invention is in the range of from 4,000; 10,000; 20,000; 50,000; 75,000; 100,000; 150,000; or 200,000 to 400,000; 450,000; 500,000; 600,000; 700,000; 800,000; or 1,000,000; preferably from 4,000 to 1,000,000 Daltons, more preferably from 10,000 to 1,000,000 Daltons, more preferably in the range of from 20,000 to 800,000 Daltons, more preferably in the range of from 50,000 to 700,000 Daltons, more preferably in the range of from 75,000 to 600,000 Daltons, more preferably in the range of from 100,000 to 500,000 Daltons, more preferably in the range of from 150,000 to 450,000 Daltons, and most preferably in the range of from 200,000 to 400,000 Daltons. The $M_w$ of the polymers of the present invention is preferably in the range of from 100,000 to 1,000,000 Daltons, more preferably in the range of from 200,000 to 600,000 Daltons, and most preferably in the range of from 250,000 to 500,000, when $m_1$ is 0, $m_2$ is greater than 0, $X^-$ is $Cl^-$, $R_2$ is —$CH_2CH(OH)CH_2$—, and $R_3$ and $R_4$ are —$CH_3$. The $M_w$ of the polymers of the present invention is preferably in the range of from 100,000 to 1,000,000 Daltons, more preferably in the range of from 200,000 to 600,000 Daltons, and most preferably in the range of from 250,000 to 500,000 Daltons, when $m_1$ and $n_1$ are 0, $m_2$ and $n_2$ are greater than 0, $X^-$ is $Cl^-$, Y is —C(=O)—, $R_2$ is —$CH_2CH(OH)CH_2$—, $R_3$ and $R_4$ are —$CH_3$, and $R_5$ is —$CH_2CH_2$—.

Not wishing to be bound by theory, it is believed that the charge density of vinylamine-containing polymers of this invention that have pendant and randomly distributed quaternary ammonium groups is less affected by pH in an aqueous media because of its quaternary amine functional groups. Additionally, it is believed that such polymers are more suitable as agents for stickies and pitch control.

Vinylamine-containing polymers comprising randomly distributed repeating monomer units having the formula (I) or (II) exhibit reduced viscosity compared to the unmodified vinylamine-containing polymer at the same polymer concentration. This is particularly true of vinyl-amine containing polymers comprising randomly distributed repeating monomer units having the formula (II). Not wishing to be bound by theory, the decreased viscosity may be attributable to reduced water binding ability of the polymer. Solution viscosity of vinylamine-containing polymers acylated with succinic anhydride is found to be much higher than that of unmodified vinylamine-containing polymer when the molar ratio of succinic anhydride to vinylamine units is the in the range of from 0.02 to 0.6. Not wishing to be bound by theory, it is believed that this higher solution viscosity is due to intermolecular charge interactions between carboxylic acid and unreacted pendant primary amine groups. For example, polyvinylamine with an active polymer concentration of 12% has a Brookfield viscosity of about 1200 cps, while the Brookfield viscosity of the same amount of polyvinylamine acylated with succinic anhydride is typically more than 2700 cps and can be as high as 4000 cps. By adding pendant quaternary ammonium functionality to such polymers, the viscosity can be reduced significantly. For example, the viscosity for polyvinylamine acylated with succinic anhydride and alkylated with 3-chloro-2-hydroxypropyltrimethylammonium chloride (respective molar ratios to vinylamine units at 0.039/0.37/1.0 at higher polymer solids) is about 700 cps. Not wishing to be bound by theory, this decreased viscosity may be attributable to changes in polymer conformation resulting from conversion of 37% of the polymer's pendant primary amine groups to secondary amines, thus reducing the ability of such polymers to bind water. This property is beneficial for large scale production from an economic standpoint.

Regarding vinylamine-containing polymers acylated or alkylated with agents containing an amine-reactive functional group and that has or generates a carboxylic acid after acylation or alkylation contain pendant carboxylic acid groups distributed along the linear backbone of the polymer, not wishing to be bound by theory, the altered physical properties in aqueous media and improved intermolecular and intramolecular charge interactions exhibited by these polymers, compared to those of unmodified vinylamine-containing polymers, are likely due to their amphoteric character. Solubility of these polymers in water is dependent on the molar ratio of succinic anhydride used for the acylation and the pH of the polymer solution. At neutral to acidic pH, some succinyl-acylated vinylamine-containing polymers tend to coagulate and precipitate out from the solution during storage. Not wishing to be bound by theory, this behavior is possibly due to the strong intramolecular charge interaction between the pendant carboxylic acid and primary amine moieties of the polymer. Appending substituents containing quaternary ammonium functionality to vinylamine-containing polymer, e.g., by alkylation with 3-chloro-2-hydroxypropyltrimethylammonium chloride, reduces the chance of the interaction between the pendant primary amine group and the carboxylic acid. The quaternary ammonium functionality has an independent charge density at different pH and forms weaker electrostatic bonds with carboxylic acid moieties compared to primary amine. This helps stabilize solutions of these amphoteric polymers and prevents their aggregation and precipitation from solution.

Vinylamine-containing polymers comprising randomly distributed repeating units having the formulae (II), or (I) and (II), or (II) and (IV), or (II) and (V), or (II) and (VI) are preferably used as dry strength additives for paper products, to accelerate the drainage of the pulp fiber, and to increase the retention of fines and fillers by the pulp fibers during the papermaking process. Not wishing to be bound by theory, it is preferable that this polymer contain at least 2%, more preferably at least 5%, more preferably at least 10%, more preferably at least 15%, and most preferably at least 20% on molar basis of unreacted pendant primary amine groups on the polymer backbone. Preferably, the polymer has an overall positive charge density at pH 4.0, preferably at pH 5.0, more preferably at 6.0, and most preferably at pH 7.0 so as to be effective for papermaking uses. Compositions of vinylamine-containing polymers comprising randomly distributed repeating units having the formulae (II), or (I) and (II), or (II) and (IV), or (II) and (V) or (II) and (VI) also provide the desired application property for the paperboard product. These polymers are effective at a treatment level in the range of from 0.01, 0.02, 0.03, 0.05, 0.08, or 0.1% to 0.5, 0.6, 0.75, 1.0, 1.5, or 2.0% based on dry pulp; preferably from 0.01% to 2.0%, preferably from 0.02% to 1.5%, more preferably from 0.03% to 1.0%, more preferably from 0.05% to 0.75%, more preferably from 0.08% to 0.6%, and most preferably from 0.1% to 0.5%, based on the dry pulp.

The polymers of the present invention can be used in a combination with other compositions in order to improve the properties of the polymer. The compositions that may be used in combination with the polymers of the present invention can be a cationic, or an anionic, or an amphoteric, or a nonionic synthetic, or a natural polymer. For example, the polymers of the present invention can be used together with a cationic starch or an amphoteric starch to improve the strength properties of paper products. The polymers of the present invention can also be used in combination with an anionic polymer, such as a polyacrylic acid, a copolymer of acrylamide and acrylic acid, or a carboxylmethyl cellulose; a cationic polymer such as a crosslinked polyamidoamine, a polydiallyldimethylammonium chloride, or a polyamine; to form a polyelectrolyte complex to improve the strength properties of paper products. The polymers of the present invention can also be used in combination with polymeric aldehyde-functional compounds, such as glyoxalated polyacrylamides, aldehyde celluloses and aldehyde functional polysaccharides. Individual compositions or any combination of different compositions may be applied together with the polymers of the present invention, or may be applied sequentially before or after the application of the polymers of the present invention. Individual compositions may be blended together with the polymers of the present invention to form a blended composition prior to use.

The embodiments of the invention are defined in the following Examples. It should be understood that these Examples are given by way of illustration only. Thus various modifications of the present invention in addition to those shown and described herein will be apparent to those skilled in the art from the foregoing description. Although the invention has been described with reference to particular means, materials and embodiments, it is to be understood that the invention is not limited to the particulars disclosed, and extends to all equivalents within the scope of the appended claims.

EXAMPLES

Polyvinylamine is abbreviated as PVAm. In the following examples, PVAm alkylated with an alkylating agent containing a cationic functional group may be described, for example, as PVAm quaternary ammonium (24). The number in the parentheses represents the mole % of 3-chloro-2-hydroxypropyltrimethylammonium chloride used in the reaction relative to vinylamine units. When these PVAm quaternary ammonium derivatives are also acylated with succinic anhydride, they may be described as, for example, succinyl PVAm quaternary ammonium (10:20). The numbers 10 and 20 in the parentheses respectively represent the mole % of succinic anhydride and 3-chloro-2-hydroxypropyltrimethylammonium chloride used in the reaction relative to vinylamine units. If the reaction efficiency is 100%, 10 mole % of the vinylamine units in the polyvinylamine are acylated by succinic anhydride and 20 mole % are alkylated by 3-chloro-2-hydroxypropyltrimethylammonium chloride. The remaining unreacted vinylamine units in this polyvinylamine derivative would be 70 mole %. As another example, succinyl PVAm (36), indicates that succinic anhydride is used for the reaction at 36 mole % relative to vinylamine units. When PVAm quaternary ammonium derivatives are also alkylated with an alkyl glycidyl ether, they may be described as, for example, as C4-PVAm quaternary ammonium (1:24). The numbers in the parentheses indicate that a C4 alkyl glycidyl ether or butyl alkyl glycidyl ether is used at a 1 mole % relative to vinylamine units while 3-chloro-2-hydroxypropyltrimethylammonium chloride is used at 24 mole %.

Size exclusion chromatography (SEC) was used to measure molecular weight. The analysis was accomplished using gel permeation columns (CATSEC 4000+1000+300+100) and Waters 515 series chromatographic equipment with a mixture of 1% $NaNO_3$/0.1% Trifluoroacetic acid in 50:50 $H_2O:CH_3CN$ as the mobile phase. The flow rate was 1.0 mL/min. The detector was a Hewlett Packard 1047A differential refractometer. Column temperature was set at 40° C. and the detector temperature was at 35° C. The number average (Mn) and weight average molecular weight (Mw) of the polymers were calculated relative to the commercially available narrow molecular weight standard poly(2-vinyl pyridine).

The charge densities (Mütek) of the ionized polymers in the present invention were measured at pH 7.0 using a colloid titration method. Charge density (meq/g) is the amount of cationic charge per unit weight, in milliequivalents per gram of product solids. The polymer sample is titrated with potassium polyvinyl sulfate (PVSK) to a 0 mV potential with an autotitrator (Brinkmann Titrino) at a fixed titration rate (0.1 mL/dose, 5 sec) and a Mütek particle charge detector (Model PCD 03, BTG, Muetek Analytic Inc., 2141 Kingston Ct., Marietta, Ga., USA) is used for end point detection.

Brookfield viscosity (BV) was measured using a DV-II Viscometer (Brookfield Viscosity Lab, Middleboro, Mass.). A selected spindle (number 2) was attached to the instrument, which was set for a speed of 30 RPM. The reaction solution is prepared at a specific solid content. The Brookfield viscosity spindle was carefully inserted into the solution so as not to trap any air bubbles and then rotated at the above-mentioned speed for 3 minutes at 24° C. The units are in centipoises (cps).

Active polymer in the polymers of the present invention represents the total weight as a percentage in a solution of all the monomers and modifying compounds used for making such a polymer on dry basis. For example, N-vinylformamide is the monomer precursor for polyvinylamine and has molecular weight of 71.1. Thus, a 100 g polyvinylamine solution containing a polymer originally made with 7.11 g of N-vinylformamide has 7.11% active polymer.

Example 1

PVAm Quaternary Ammonium (25)

To a polyvinylamine solution (Hercobond® 6363 paper performance additive, available from Hercules Incorporated, 12% active polymer, 300 g) in a 1 L reaction flask was added aqueous sodium hydroxide to raise the pH to 12.0. The reaction mixture was heated to 50° C. and then 3-chloro-2-hydroxypropyltrimethylammonium chloride (Quat® 188, available from Dow Chemical Company, 69% active, 34.8 g) was added over 10 minutes while the pH was maintained in the range of from 11.5 to 12.0 with aqueous sodium hydroxide. The resulting mixture was stirred at 50° C. for 3 hours and the pH was maintained in the range of from 11.0 to 11.5 using 25% aqueous sodium hydroxide. After cooling to ambient temperature, the pH was adjusted to 8.5 with aqueous hydrochloric acid to give the final product with total solids of 27.5% and total active polymer of 14.9%. The charge density measured 7.77 meq/g at pH 7.0. Brookfield viscosity is 511 cps. SEC: Mw: 383,000; Mw/Mn: 4.17. SEC of polyvinylamine (Hercobond® 6363): Mw: 306,000; Mw/Mn: 4.62.

Examples 1-1, 1-2, and 1-3 in Table I were prepared as described in Example 1 using different molar ratios of 3-chloro-2-hydroxypropyltrimethyl-ammoniun chloride (Quat 188, Dow Chemical Company, 65% active, 27.7 g) to polyvinylamine (Hercobond® 6363 paper performance additive, available from, Hercules, 12% active polymer).

TABLE I

Polyvinylamine Derivative with Pendent Quaternary Ammonium

| Examples | Compositions | Active Polymer % | CD (meq/g) | Viscosity (cps) |
|---|---|---|---|---|
| Example 1-1 | PVAm Quaternary Ammonium (34) | 16.5 | 7.09 | 447 |
| Example 1-2 | PVAm Quaternary Ammonium (38) | 16.0 | 6.83 | 470 |
| Example 1-3 | PVAm Quaternary Ammonium (63) | 21.7 | 5.02 | 509 |

Example 2

PVAm Tertiary Amine (41)

To a polyvinylamine solution (Hercobond® 6363 paper performance additive, available from Hercules Incorporated, 12% active polymer, 325 g) in a 1 L reaction flask was added aqueous sodium hydroxide to raise the pH to 11.5. 2-(diethylamino)ethyl chloride HCl (available from Aldrich Chemical Company, 100%, 39 g) was added over 10 minutes at 23° C. while the pH was maintained in the range of from 11.5 to 12.0 using 25% aqueous sodium hydroxide. The resulting mixture was heated to 60° C. and stirred at this temperature for 3 hours and the pH was maintained in the range of from 11.0 to 11.5 using 25% aqueous sodium hydroxide. After cooling to ambient temperature, the pH was adjusted to 8.0 to give the final product with total active polymer of 15.8%. Brookfield viscosity is 625 cps.

Example 3

C4-PVAm Quaternary Ammonium (6:25)

To a polyvinylamine solution (Hercobond® 6363 paper performance additive, available from Hercules Incorporated, 12% active polymer, 300 g) in a 1 L reaction flask was added aqueous sodium hydroxide to raise the pH to 12.0. The reaction mixture was heated to 50° C. and butyl glycidyl ether (available from SaChem, 99%, 4 g) was added over 10 minutes followed by 3-chloro-2-hydroxypropyltrimethylammonium chloride (Quat® 188, available from Dow Chemical Company, 69% active, 34.8 g) while the pH was maintained in the range of from 11.5 to 12.0 with aqueous sodium hydroxide. The resulting mixture was stirred at 50° C. for 4 hours and the pH was maintained in the range of from 11.0 to 11.5 using 25% aqueous sodium hydroxide. After cooling to ambient temperature, the pH was adjusted to 8.3 to give the final product with total active polymer of 13.7%. The charge density measured 6.5 meq/g at pH 7.0. Brookfield viscosity is 520 cps. SEC: Mw: 378,000; Mw/Mn: 3.96.

Example 4

C8-PVAm Quaternary Ammonium (4:25)

To a polyvinylamine solution (Hercobond® 6363 paper performance additive, available from Hercules Incorporated, 12% active polymer, 300 g) in a 1 L reaction flask was added aqueous sodium hydroxide to raise the pH to 12.0. The reaction mixture was heated to 50° C. and 2-ethylhexylglycidyl ether (2-EHGE) (available from SaChem, 99%, 2 g) was added over 10 minutes followed by 3-chloro-2-hydroxypropyltrimethylammonium chloride (Quat® 188, available from Dow Chemical Company, 69% active, 34.8 g) while the pH was maintained in the range of from 11.5 to 12.0 with aqueous sodium hydroxide. The resulting mixture was stirred at 50° C. for 4 hours and the pH was maintained in the range of from 11.0 to 11.5 using 25% aqueous sodium hydroxide. After cooling to ambient temperature, the pH was adjusted to 8.0 to give the final product with total active polymer of 12.4%. The charge density measured 7.5 meq/g at pH 7.0. Brookfield viscosity is 530 cps. SEC: Mw: 650,000; Mw/Mn: 8.29.

Example 5

Succinyl-PVAm Quaternary Ammonium (4/38)

To a polyvinylamine solution (Hercobond® 6363, paper performance additive, available from Hercules Incorporated, 12% active polymer, 150 g) in a 500 mL reaction flask was added aqueous sodium hydroxide to raise the pH to 12.0. The reaction mixture was heated to 50° C. and 3-chloro-2-hydroxypropyltrimethylammonium chloride (Quat® 188, Dow Chemical Company, 65% active, 27.7 g) was added in 2 minutes. The reaction mixture was stirred at 50° C. for 2 hours while the pH was maintained in the range of from 11.5 to 12.0 using 50% aqueous sodium hydroxide. After cooling to ambient temperature, the pH was adjusted to 8.0 with aqueous hydrochloric acid, followed by addition of succinic anhydride (Aldrich Chemical Co., 1 g). The reaction mixture was stirred at a temperature in the range of from 24° C. to 30° C. for 1 hour and the pH was maintained in the range of from 7.0 to 8.0 using aqueous sodium hydroxide. The final product was obtained with total solids of 30% and total active polymer of 19.0%. The charge density measured 6.4 meq/g at pH 7.0. Brookfield viscosity is 690 cps; SEC: Mw: 440,000; Mw/Mn: 4.85. SEC of polyvinylamine (Hercobond® 6363): Mw: 306,000; Mw/Mn: 4.62.

Examples 5-1, 5-2, 5-3, 5-4, 5-5, and 5-6 in Table II were prepared as described in Example 5 using different molar ratios of succinic anhydride and 3-chloro-2-hydroxypropyltrimethylammonium chloride (Quat® 188, Dow Chemical Company, 65% active, 27.7 g) to polyvinylamine (Hercobond® 6363, paper performance additive, available from Hercules Incorporated, 12% active polymer).

SEC of succinyl-PVAm Quaternary Ammonium (4:23): Mw: 390,000; Mw/Mn: 5.22. SEC of succinyl PVAm Quaternary Ammonium (16:17): Mw: 437,000; Mw/Mn: 5.23.

TABLE II

Succinyl-PVAm Quaternary Ammonium Compositions

| Examples | Compositions | Active polymer % | CD (meq/g) | Viscosity (cps) |
|---|---|---|---|---|
| Example 5-1 | Succinyl PVAm Quaternary Ammonium (4:34) | 15.5 | 6.09 | 391 |
| Example 5-2 | Succinyl PVAm Quaternary Ammonium (4:25) | 15.0 | 6.32 | 507 |
| Example 5-3 | Succinyl PVAm Quaternary Ammonium (4:23) | 11.9 | 6.77 | 380 |
| Example 5-4 | Succinyl PVAm Quaternary Ammonium (16:17) | 13.0 | 4.57 | 600 |
| Example 5-5 | Succinyl PVAm Quaternary Ammonium (20:15) | 12.3 | 4.58 | 650 |
| Example 5-6 | Succinyl PVAm Quaternary Ammonium (24:13) | 11.2 | 3.07 | 670 |

Example 6

Succinyl-PVAm Quaternary Ammonium (8:25)

To a polyvinylamine solution (Hercobond® 6363, paper performance additive, available from Hercules Incorporated 12% active polymer, 300 g) in a 1 L reaction flask was added aqueous sodium hydroxide to raise the pH to 12.0. The reaction mixture was heated to 70° C. and then 3-chloro-2-hydroxypropyltrimethylammonium chloride (Quat® 188, Dow Chemical Company, 69% active, 34.8 g) was added in 2 minutes. The reaction mixture was stirred at 70° C. for 1 hour while the pH was maintained in the range of from 11.5 to 12.0 using 50% aqueous sodium hydroxide. After cooling, the pH was adjusted to 8.0 and succinic anhydride (Aldrich Chemical Company, 4 g) was added. The reaction mixture was stirred at a temperature in the range of from 24° C. to 30° C. for 2 hours and the pH was maintained in the range of from 7.0 to 8.0 using aqueous sodium hydroxide. After diluting with water, the final product was obtained with a total active polymer of approximately 14.5%. Brookfield viscosity is 810 cps. SEC: Mw: 404,000; Mw/Mn: 4.95. Charge density: 5.9 meq/g (pH 7.0).

Example 7

Maleyl-PVAm Quaternary Ammonium (4:38)

To a polyvinylamine solution (Hercobond® 6363, paper performance additive, available from Hercules Incorporated 12% active polymer, 300 g) in a 1 L reaction flask was added aqueous sodium hydroxide to raise the pH to 12.0. The reaction mixture was heated to 50° C. and then 3-chloro-2-hydroxypropyltrimethylammonium chloride (Quat® 188, Dow Chemical Company, 69% active, 52.2 g) was added in 2 minutes. The reaction mixture was stirred at 50° C. for 2 hours while the pH was maintained in the range of from 11.5 to 12.0 using 50% aqueous sodium hydroxide. After cooling, the pH was adjusted to 8.0 and maleic anhydride (Aldrich Chemical Company, 2 g) was added. The reaction mixture was stirred at a temperature in the range of from 24° C. to 30° C. for 1 hour and the pH was maintained in the range of from 7.0 to 8.0 using aqueous sodium hydroxide. The final product is obtained with a total solid of 30% and a total active polymer of 19.0%. The charge density was 6.14 meq/g (pH 7.0).

Example 8

Succinyl-PVAm (36)

A polyvinylamine solution (Hercobond® 6363, paper performance additive, available from Hercules Incorporated 12% active, 500 g) in a 1 L reaction flask at pH 8.5 was heated to 40° C. and then succinic anhydride (Aldrich Chemical Company, 30 g) was added in 45 minutes while the pH was maintained in the range of from 7.0 to 8.0 with 50% aqueous sodium hydroxide. During the reaction, 90 g of water was added at 40° C. to reduce the viscosity and pH was maintained in the range of from 7.0 to 8.0 with aqueous sodium hydroxide. The final product had 12% active polymer. Brookfield viscosity is 1210 cps. Charge density: 0.38 meq/g (pH 7.0).

Examples 8-1, 8-2, 8-3, 8-4, 8-5, and 8-6 in Table III are prepared as described in Example 8 using different molar ratios of succinic anhydride to polyvinylamine (Hercobond® 6363, paper performance additive, available from Hercules Incorporated, 12% active polymer).

TABLE III

Succinyl PVAm Compositions

| Examples | Compositions | Active polymer (%) | CD (meq/g) | Viscosity (cps) |
|---|---|---|---|---|
| Example 8-1 | Succinyl PVAm (18) | 13.0 | 4.90 | 3100 |
| Example 8-2 | Succinyl PVAm (24) | 14.2 | 2.88 | 3690 |
| Example 8-3 | Succinyl PVAm (32) | 13.9 | — | 3054 |
| Example 8-4 | Succinyl PVAm (40) | 14.6 | — | 2629 |
| Example 8-5 | Succinyl PVAm (48) | 13.5 | −0.91 | 2490 |
| Example 8-6 | Succinyl PVAm (56) | 14.8 | −2.08 | 3639 |

Example 9

Maleyl-PVAm (85)

To a polyvinylamine solution (Hercobond® 6363, paper performance additive, available from Hercules Incorporated 12% active, 150 g) in a 500 mL reaction flask at pH 7.0 at room temperature was added maleic anhydride (Aldrich Chemical Company, 21.5 g) over 35 minutes while the pH was maintained at 7.0 with 10% aqueous sodium hydroxide. The mixture was stirred at room temperature for 2 hours while water was added to reduce the viscosity and the pH was maintained at around 7.0. The mixture was adjusted to pH 4.0 with aqueous hydrochloric acid to give the final product containing 13.7% active polymer.

Example 10

Tertiary PVAm Quaternary Ammonium (18:18)

A stirred solution of polyvinyl amine (Hercobond® 6363, Hercules, Inc., 250 g) heated to 50° C. in a 500-mL flask was adjusted to pH 10 by treatment with 50% aqueous sodium hydroxide. Over 8 minutes, 3-chloro-hydroxypropyltrimethylammonium chloride (Quat 188®, Dow Chemical Company, 65 weight % aqueous solution, 22.05 g) was added and the resulting mixture stirred for 2 h. To this was added in one portion 2-(diethylamino)ethyl chloride hydrochloride (DEC, Sigma-Aldrich, 13.11 g), followed by distilled water (10 g). The pH was adjusted to 10 with 50% aqueous sodium hydroxide and stirred for 2.5 h. The mixture was cooled to room temperature and adjusted to pH 7.5 with concentrated hydrochloric acid to give a product with a total solids content of 27.8% and a calculated active solids content of 17.5%. Brookfield viscosity (30 rpm, spindle 3): 678 cps; Charge density: 8.70 meq/g at pH 7.0.

Examples 10-1 and 10-2, were prepared as described in Example 10 example using different molar ratios of Quat® 188 and DEC to polyvinylamine.

TABLE III (A) Tertiary PVAm Quaternary Ammonium Compositions

| Example | Compositions | Active polymer % | CD (meq/g) | Viscosity (cps) |
|---|---|---|---|---|
| Example 10-1 | Tertiary PVAm Quaternary Ammonium (33.3:3.3) | 17.7 | 8.31 | 733 |
| Example 10-2 | Tertiary PVAm Quaternary Ammonium (44:10) | 19.9 | 6.90 | 671 |

Example 11

Tertiary PVAm Methyl Carboxylic Acid (29:7)

A stirred solution of polyvinyl amine (250 g) heated to 50° C. in a 500-mL flask was adjusted to pH 10 by treatment with 50% aqueous sodium hydroxide. To this was added DEC (21.44 g) in one portion, followed by distilled water (20 g). The pH was adjusted to 10 with 50% aqueous sodium hydroxide. After stirring for 3 h, sodium chloroacetate (Sigma-Aldrich, 3.44 g) was added and the mixture was stirred for 4 h more. The mixture was cooled to room temperature and adjusted to pH 8 with concentrated hydrochloric acid to give a product with a total solids content of 36.6% and a calculated active solids content of 16.4%. Brookfield viscosity (30 rpm, spindle 3) is 696 cps; Charge density 6.06 meq/g at pH 7.0.

Example 12

Quaternary PVAm Methyl Carboxylic Acid (29:7)

A stirred solution of polyvinyl amine (250 g) heated to 50° C. in a 500-mL flask was adjusted to pH 10 by treatment with 50% aqueous sodium hydroxide. Over 10 minutes, Quat 188® (36.06 g) was added and the resulting mixture stirred for 2 h. The pH was maintained at 10 using 50% aqueous sodium hydroxide. To this was added sodium chloroacetate (Sigma-Aldrich, 3.22 g) in one portion, followed by distilled water (15 g). The mixture was stirred 4 h more. The mixture was cooled to room temperature and adjusted to pH 4.8 with concentrated hydrochloric acid to give a product with a total solids content of 16.2% and a calculated active solids content of 38.85%. Brookfield viscosity (30 rpm, spindle 3): 608 cps.

Example 13

Glucose (28%)-PVAm

To a polyvinylamine solution (Hercobond® 6363, paper performance additive, available from Hercules Incorporated 12% active, 166.7 g) in a 500 mL reaction flask at pH 9.0 at room temperature was added glucose (8.6 g) dissolved in 66 g water over 10 minutes. The resulting mixture was stirred 23° C. for 2 hours. The product had 14.0% active polymer, pH 7.9. Brookfield viscosity was 352 cps.

Example 14

Lactose (20%)-PVAm

To a polyvinylamine solution (Hercobond® 6363, paper performance additive, available from Hercules Incorporated 12% active, 240.6 g) in a 500 mL reaction flask at pH 12.0 at room temperature was added lactose (8.0 g) dissolved in 37 g water over 10 minutes. The resulting mixture was stirred 35 C for 1 hour. The mixture was adjusted to pH 8.0 with 20.9 g of 37.5% HCl and diluted with water to give the final product containing 12% active polymer. Brookfield viscosity was 1856 cps.

Example 15

Maltodextrin (33%)-PVAm

To a polyvinylamine solution (Hercobond® 6363, paper performance additive, available from Hercules Incorporated 12% active, 188 g) in a 500 mL reaction flask at pH 11.8 at room temperature was added a maltodextrin (Maltrin M200, Grain Processing Corp., 12.5 g) dissolved in 67.4 g water over 10 minutes. The resulting mixture was stirred at 35° C. for 75 minutes. The mixture was adjusted to pH 8.0 with 17.3 g of 37.5% HCl and diluted with water to give the final product containing 12% active polymer. Charge density: 4.26 meq/g; Brookfield viscosity was 704 cps.

Example 16

Maltodextrin (12.5%)-PVAm Quaternary Ammonium (25)

To a polyvinylamine solution (Hercobond® 6363, paper performance additive, available from Hercules Incorporated 12% active polymer, 270.7 g) in a 1 L reaction flask, at pH 12.5, was added 3-chloro-2-hydroxypropyltrimethylammonium chloride (Quat® 188, Dow Chemical Company, 65% active, 36.9 g) over 30 minutes at 50° C. Then a maltodextrin (Maltrin M200, Grain Processing Corp., 10.0 g) dissolved in 172 g water was added over 30 minutes at 50 C, followed by the addition of 10 g of 50% NaOH in 30 minutes. The resulting mixture was stirred at 50 C for 2 hours, and then cooled to room temperature. The pH was adjusted to 7.5 using 27.6 g of 37.5% HCl. The material was diluted with 55.7 g of water to give the final product containing 12% active polymer. SEC: Mw: 338,000; Mw/Mn: 7.25. Brookfield viscosity was 189 cps.

Example 17

Quaternary PVAm Acetamide (29:7)

A stirred solution of polyvinyl amine (Hercobond® 6363, Hercules, Inc., 250 g) heated to 50° C. in a 500-mL flask was adjusted to pH 10 by treatment with 50% aqueous sodium hydroxide. Over 8 minutes, 3-chlorohydroxypropyltrimethylammonium chloride (Quat 188®, Dow Chemical Company, 65 weight % aqueous solution, 36.06 g) was added and the resulting mixture stirred for 2 h. To this was added in one portion chloroacetamide (Sigma-Aldrich, 2.65 g), followed by distilled water (6 g). After stirring for 2.5 h more, the mixture was cooled to room temperature and adjusted to pH 7.5 with concentrated hydrochloric acid to give a product with a calculated active solids content of 16.3%. Brookfield viscosity: 697 cps; SEC: $M_w$: 414,000 $M_w/M_n$: 5.59; Charge density: 6.88 meq/g at pH 8.0. This product did not meet the gelation stability target and had a viscosity greater than 1500 cps within two months. Portions of this product were further acidified and had good stability at pH<5.

Example 18

PVAm Acetamide (29)

A stirred solution of polyvinyl amine (Hercobond® 6363, Hercules, Inc., 250 g) heated to 50° C. in a 500-mL flask was adjusted to pH 8.0 by treatment with 50% aqueous sodium hydroxide. To this was added in one portion chloroacetamide (Sigma-Aldrich, 11.656 g), followed by distilled water (14 g). After stirring for 1 h more, the mixture was diluted with 50 g distilled water. The reaction mixture was stirred 4 h more, then cooled to room temperature and adjusted to pH 4.5 with concentrated hydrochloric acid to give a product with a total solids content of 25.9% and a calculated active solids content of 11.6%. Brookfield viscosity: 505 cps.

Example 19

Tertiary PVAmidine (29)

A stirred solution of approximately 50% hydrolyzed polyvinyl formamide (Hercobond® 6350, Hercules, Inc., 250 g) heated to 50° C. in a 500-mL flask was adjusted to pH 11.0 by treatment with 50% aqueous sodium hydroxide. To this was added in one portion DEC (Sigma-Aldrich, 21.460 g), followed by distilled water (23 g). After this addition was complete, the pH was adjusted to 10 with 50% aqueous sodium hydroxide. The mixture was stirred for 2 h more, then cooled to room temperature and adjusted to pH 7.5 with concentrated hydrochloric acid to give a product with a total solids content of 23.4% and a calculated active solids content of 14.8%. Brookfield viscosity: 550 cps; SEC: $M_w$: 356,000 $M_w/M_n$: 1.90; Charge density: 7.41 meq/g at pH 7.0.

Example 20

PVAmidine Quaternary Ammonium (29)

A stirred solution of approximately 50% hydrolyzed polyvinyl formamide (Hercobond® 6350, Hercules, Inc., 250 g) heated to 50° C. in a 500-mL flask was adjusted to pH 10.4 by treatment with 50% aqueous sodium hydroxide. To this was added Quat® 188 (65% solution, 36.57 g), dropwise over 10 min. After this addition was complete, the pH was adjusted to 10 with 50% aqueous sodium hydroxide. The mixture was stirred for 4 h more, then cooled to room temperature and adjusted to pH 7.5 with concentrated hydrochloric acid to give a product with a calculated active solids content of 17.8%. Brookfield viscosity: 885 cps.

Example 21

Tertiary PVAmidine Acetamide (29:7)

A stirred solution of approximately 50% hydrolyzed polyvinyl formamide (Hercobond® 6350, Hercules, Inc., 250 g) heated to 50° C. in a 500-mL flask was adjusted to pH 7.5 by treatment with concentrated hydrochloric acid. To this was added in one portion chloroacetamide (Sigma-Aldrich, 11.642 g), followed by distilled water (7 g). After stirring for 1 h more, the mixture was diluted with 50 g distilled water. The reaction mixture was stirred 2.5 h, then was treated with DEC (6.35 g) and distilled water (12 g). The pH was adjusted to 7.8, and the mixture stirred 2 h more, after which it was cooled to room temperature and adjusted to pH 4.5 with concentrated hydrochloric acid to give a product with a total solids content of 18.07% and a calculated active solids content of 13.3%. Brookfield viscosity: 239 cps.

Example 22

Chloropropanediol Modified PVAm

To 208.9 g of a polyvinylamine solution (Hercobond® 6363, paper performance additive, available from Hercules Incorporated) in a 500-mL reaction flask, at pH 11.8, was added 84.34 g of water and 9.78 g of 3-chloro-2-hydroxypropanol (chloropropanediol, CPD, Aldrich Chemical Company) at 25° C. After 22 hours, the pH had dropped to 10.0 and the product was bottled. GC analysis indicated 277 ppm of residual CPD.

Example 23

Chloropropanediol Modified PVAm (Used 2 Times Higher CPD:PVAm Ratio Relative to Example 22)

To 160.3 g of a polyvinylamine solution (Hercobond® 6363, paper performance additive, available from Hercules Incorporated) in a 500-mL reaction flask, at pH 11.8, was added 124.7 g of water. The solution was heated to 60° C. and then 15.0 g of CPD was added over 5 minutes. After 6 hours, the reaction mixture was allowed to cool to ambient temperature (21° C.) overnight. The pH had dropped to 8.8 and the product was bottled. GC analysis indicated 1373 ppm of residual CPD.

Example 24

Chloropropanediol Modified PVAm (Used 4 Times Higher CPD:PVAm Ratio Relative to Example 22)

To 109.35 g of a polyvinylamine solution (Hercobond® 6363, paper performance additive, available from Hercules Incorporated) in a 500-mL reaction flask, at pH 11.8, was added 170.18 g of water. The solution was heated to 60° C. and then 20.49 g of CPD was added over 7 minutes. After 6 hours, the reaction mixture was allowed to cool to ambient temperature (21° C.) overnight. The pH had dropped to 8.1 and the product was bottled. GC analysis indicated 22,340 ppm of residual CPD.

Comparative Example 1

Poly(Vinylamine-co-Acrylic Acid) (80:20)

To a reaction flask equipped with a stirrer was charged 771.5 g of distilled water, 0.99 g of 75% phosphoric acid and 0.68 g of 50% sodium hydroxide solution. The resulting mixture was heated to 70° C. under a stream of nitrogen. When temperature reached to 70° C., a solution of 50 g of water, 30 g of acrylic acid and 33.3 g of 50% sodium hydroxide solution, and 118.2 g of N-vinylformamide, and a solution of 18.5 g of water and 0.037 g of 2,2'-azobis(2-methylpropionamidine)dihydrochloride were added simultaneously thought three separated dropping funnels and the addition took 2 hours. After the end of the monomer addition, a solution of 0.11 g of 2,2'-azobis(2-methylpropionamidine)dihydrochloride in 55.6 g of water was added in 1 hour. The reaction mixture was then stirred for a further 4 hours at 70° C. and was finally diluted with 586 g of water, followed by the addition of 5 g of 0.5% sodium bisulfite solution. To the resulting mixture was added 800 g of 10% sodium hydroxide in the course of 20 minutes. The reaction mixture was heated at 70° C. for 6 hours and was cooled to room temperature, and 40 g of 37.5% hydrochloric acid were added. The solution has the active polymer at 6.06% and pH at 7.6. Brookfield viscosity is 520 cps. The charge density of the copolymer is 1.8 meq/g (at pH 7.0)

Comparative Example 2

Poly(Vinylamine-co-Acrylic Acid) (30:70)

To a reaction flask equipped with a stirrer was charged 683 g of distilled water, 0.953 g of 75% phosphoric acid and 0.654 g of 50% sodium hydroxide solution. The resulting mixture was heated to 70° C. under a stream of nitrogen. When temperature reached to 70° C., a solution of 167 g of water, 100 g of acrylic acid and 110.8 g of 50% sodium hydroxide solution, and 42.2 g of N-vinylformamide, and a solution of 18 g of water and 0.036 g of 2,2'-azobis(2-methylpropionamidine) dihydrochloride were added simultaneously thought three separated dropping funnels and the addition took 2 hours. After the end of the monomer addition, a solution of 0.18 g of 2,2'-azobis(2-methylpropionamidine)dihydrochloride in 56 g of water was added in 1 hour. The reaction mixture was then stirred for a further 4 hours at 70° C. and was finally diluted with 365 g of water, followed by the addition of 5 g of 0.5% sodium bisulfite solution. To the resulting mixture was added 69.5 g of 37.5% hydrochloric acid. The reaction mixture was heated at 70° C. for 8 hours and was cooled to room temperature, and 242.7 g of a 20% sodium hydroxide were added. The solution has the active polymer at 7.68% and pH at 7.6. Brookfield viscosity is 860 cps. The charge density of the copolymer is −1.2 meq/g (at pH 7.0)

Example 25

Evaluation as Dry Strength Additives in Papermaking Applications

The dry strengths of papers made with the polyvinylamine derivatives of the above examples are compared with the dry strengths of paper made with a benchmark dry strength resin polyvinylamine (Hercobond® 6363 paper performance additive, available from Hercules Incorporated).

Linerboard paper is made using a papermaking machine. The paper pulp is a 100% recycled medium with 50 ppm hardness, 25 ppm alkalinity, 2.5% GPC D15F and 2000 uS/cm conductivity. The system pH is 7.0 and the pulp freeness is 350-420 CSF with the stock temperature at 52° C. The basis weight is 100 lbs per 3000 ft$^2$. Polyvinylamine derivatives prepared in the above examples are added as dry strength agents to the wet end of the papermaking machine at the level of 0.1, or 0.2, or 0.3 weight % of active polymer versus dry paper pulp. The paper is cured at 80° C. for 0.5 hour. Dry tensile strength, Ring Crush and Mullen Burst are used to measure the dry strength effects.

The dry strength test results are shown below in Table IV. Performances of the polyvinylamine derivatives are expressed as a percentage increase over the dry strength of paper made with polyvinylamine (Hercobond® 6363 paper performance additive, available from Hercules Incorporated).

TABLE IV

Dry Strength Performances of Polyvinylamine Derivatives versus Polyvinylamine

| Products | Compositions | Mullen Burst | Ring Crush | Dry Tensile |
| --- | --- | --- | --- | --- |
| Benchmark | PVAm (Hercobond ® 6363) | 100 | 100 | 100 |
| Example 1 | PVAm Quaternary Ammonium (25) | 114.7 | 104.7 | 100.3 |
| Example 1-1 | PVAm Quaternary Ammonium (34) | 112.6 | 96.7 | 99.5 |
| Example 1-2 | PVAm Quaternary Ammonium (38) | 102.1 | 102.7 | 108.6 |
| Example 2 | PVAm Tertiary amine (41) | 105.8 | 99.4 | 102.1 |
| Example 3 | C4-PVAm Quaternary Ammonium (6:25) | 101.4 | 103.8 | 104.4 |
| Example 4 | C8-PVAm Quaternary Ammonium (4:25) | 99.6 | 100.9 | 106.1 |
| Example 5 | Succinyl PVAm Quaternary Ammonium (4/38) | 106.1 | 97.2 | 103.5 |
| Example 5-1 | Succinyl PVAm Quaternary Ammonium (4/34) | 106.0 | 91.5 | 101.2 |
| Example 5-2 | Succinyl PVAm Quaternary Ammonium (4/25) | 110.1 | 101.1 | 101.1 |
| Example 7 | Maleyl PVAm Quaternary Ammonium (4/38) | 95.2 | 100.2 | 106.5 |
| Example 8 | Succinyl PVAm (36) | 103.6 | 97.7 | 97.8 |
| Example 8-1 | Succinyl PVAm (18) | 98.6 | 97.8 | 95.4 |

For Table IV the data was evaluated using 0.1 weight % of active polymer versus dry paper pulp.

Table IV compares representative polymers of the present invention with polyvinylamine (Hercobond® 6363). PVAm quaternary ammonium, PVAm tertiary amine, and succinyl PVAm quaternary ammonium derivatives of polyvinylamine give equivalent or slightly better dry strength performances than those of polyvinylamine in Mullen Burst, Ring Crush and Dry Tensile. Table IV illustrates that succinyl-PVAm quaternary ammonium (4/25) (Example 5-2) gives a 10% improvement over polyvinylamine in Mullen Burst and a 1% improvement over polyvinylamine in both Ring Crush and Dry Tensile. Succinyl-PVAm performs comparably to polyvinylamine in Mullen Burst, but is slightly less effective than polyvinylamine in Ring Crush and Dry Tensile strength. It should be noted that even in the examples where performance is less than the Hercobond® 6363 dry-strength additive benchmark the performance is better than the blank (without additives) and the examples have improved cost effectiveness relative to Hercobond® 6363.

TABLE V

Dry Strength Performances of Tertiary PVAm Quaternary Ammonium versus Polyvinylamine

| Example | Compositions | Mullen Burst | Ring Crush | Dry Tensile |
| --- | --- | --- | --- | --- |
| Example 10 | Tertiary PVAm Quaternary Ammonium (18:18) | 105 | 110 | 108 |
| Example 10-1 | Tertiary PVAm Quaternary Ammonium (33.3:3.3) | 105 | 104 | 110 |
| Example 10-2 | Tertiary PVAm Quaternary Ammonium (44:10) | 102 | 107 | 109 |

For Table V the data was evaluated using 0.3 weight % of active polymer versus dry paper pulp.

Table V compares representative tertiary PVAm quaternary ammonium polymers of the present invention with polyvinylamine (Hercobond® 6363). All the three tertiary PVAm quaternary ammonium derivative had better dry strength performances than the polyvinylamine in all the three dry strength tests, Mullen Burst, Ring Crush and Dry Tensile.

TABLE VI

Dry Strength Performances of Oligosaccharides Modified Polyvinylamine

| Products | Compositions | Mullen Burst | Ring Crush | Dry Tensile |
| --- | --- | --- | --- | --- |
| Benchmark | PVAm (Hercobond ® 6363) | 100 | 100 | 100 |
| Example 14 | Lactose (20%)-PVAm | 107.1 | 104.6 | 101.1 |
| Example 15 | Maltodextrin (33%)-PVAm | 104.7 | 108.0 | 100.0 |
| Example 16 | Maltodextrin (12.5%)-PVAm Quaternary Ammonium (25) | 102.2 | 109.3 | 101.4 |

For Table VI the data was evaluated using 0.3 weight % of active polymer versus dry paper pulp.

Table VI shows comparable or better dry strength efficiency of monosaccharide or oligosaccharides modified polyvinylamine derivatives compared to Hercobond® 6363 dry-strength additive in all the three tests.

TABLE VII

Dry Strength Performances of Modified Polyvinylamine and Polyvinylamidine

| Example | Compositions | Mullen Burst | Ring Crush | Dry Tensile |
|---|---|---|---|---|
| Example 17 | Quaternary PVAm Acetamide (29:7) | 97.0 | 101.3 | 103.4 |
| Example 18 | PVAm Acetamide (29) | 102.3 | 105.0 | 96.5 |
| Example 19 | Tertiary PVAmidine (29) | 84.8 | 98.5 | 97.3 |
| Example 20 | PVAmidine Quaternary Ammonium (29) | 106.5 | 97.2 | 103.5 |
| Example 21 | Tertiary PVAmidine Acetamide (29:7) | 104.1 | 103.8 | 99.9 |

For Table VII the data was evaluated using 0.3 weight % of active polymer versus dry paper pulp, against Hercobond® 6363 at the same additive level.

Table VII shows comparable or better dry strength performance of two chloroacetamide alkylated polyvinylamine derivatives and three alkylated polyvinylamidine derivatives as compared to Hercobond® 6363 dry-strength additive in all the three tests.

TABLE VIII

Dry Strength Performances of Poly(Vinylamine-co-Acrylic Acid) vs. Polyvinylamine

| Products | Compositions | Mullen Burst | Ring Crush | Dry Tensile |
|---|---|---|---|---|
| Benchmark | PVAm (Hercobond ® 6363) | 100 | 100 | 100 |
| Comp. Example 1 | Poly(vinylamine-co-acrylic acid) (80:20) | 100 | 93 | 91 |
| Comp. Example 2 | Poly(vinylamine-co-acrylic acid) (30:70) | 92 | 87 | 95 |

For Table VIII the data was evaluated using 0.2 weight % of active polymer versus dry paper pulp.

The results in Table VIII show dry strength performances of amphoteric poly(vinylamine-co-acrylic acid), prepared similar to as described in U.S. Pat. No. 5,530,907, compared to PVAm (Hercobond® 6363). The results indicate that these prior art copolymers are not as effective as homopolymer, polyvinylamine in dry strength performance.

Example 26

Evaluation as Drainage Aids in Papermaking Applications

Drainage efficiency and fixative properties of the polyvinylamine derivatives alkylated with cationic groups prepared in the above examples were also compared using the Canada Freeness Test Method with Hercobond® 6363 dry strength resin and a blank. The turbidities of the filtrates were also measured to estimate fixative properties of the polymers. The dose of active polymer for all the additives was 0.1, or 0.2 or 0.3 weight % based on the dry pulp. The results are summarized in Table V and the drainage performances of these compositions are expressed as percentage increase over the blank. The fixative properties of the compositions are expressed as percentage of remaining turbidity based on that of the control in the absence of a resin. The lower the percentage, the more efficient the composition is as a fixative agent.

TABLE IX

Drainage and Fixative Properties of Polyvinylamine Derivatives with Pendent Cationic Group

| Products | Compositions | Freeness improvement vs. blank, % | Remaining Turbidity, % |
|---|---|---|---|
| Benchmark | PVAm (Hercobond ® 6363) | 141.3 | 45.7 |
| Example 1 | PVAm Quaternary Ammonium (25) | 134.1 | 43.8 |
| Example 1-1 | PVAm Quaternary Ammonium (34) | 122.2 | — |
| Example 1-2 | PVAm Quaternary Ammonium (38) | 124.4 | 42.7 |
| Example 2 | PVAm Tertiary Amine (41) | 135.3 | 39.2 |
| Example 3 | C4-PVAm Quaternary Ammonium (6:25) | 117.1 | 47.1 |
| Example 4 | C8-PVAm Quaternary Ammonium (4:25) | 112.5 | 47.0 |

For Table IX the data was evaluated using 0.2 weight % of active polymer versus dry paper pulp.

In Table IX, the higher the percentage in freeness and the lower percentage in turbidity, the better the performance. This evaluation shows that all of the PVAm derivatives alkylated with cationic groups improved drainage performance of the pulp from 12% to 35% over the blank (without additives) under the conditions employed. Both PVAm Quaternary Ammonium (34) (Example 1-1) and PVAm Tertiary Amine (41) (Example 2) perform comparably to polyvinylamine (Hercobond® 6363 dry-strength additive). It should be noted that even in the examples where performance is less than the Hercobond 6363 benchmark, the examples have improved cost effectiveness relative to Hercobond 6363. PVAm Tertiary Amine (41) (Example 2) gives a better fixative property than PVAm. Under the conditions employed, PVAM Tertiary Amine (41) lowers the turbidity of the pulp furnish to 39% of the untreated (without additives). In contrast, polyvinylamine reduces the turbidity of the pulp furnish to 45.7% of the untreated.

Drainage efficiency and fixative properties of the amphoteric polyvinylamine derivatives prepared in the above examples are also compared using the Canada Freeness Test Method with Hercobond® 6363 dry strength resin and a blank. The results are summarized in Table X.

TABLE X

Drainage and Fixative Properties of Polyvinylamine Derivatives

| Products | Compositions | Freeness improvement vs. blank, % | Remaining Turbidity, % |
|---|---|---|---|
| Benchmark | PVAm (Hercobond ® 6363) | 127.8 | 70.4 |
| Example 5 | Succinyl PVAm Quaternary Ammonium (4/38) | 113.9 | 87.7 |
| Example 5-1 | Succinyl PVAm Quaternary Ammonium (4/34) | 113.9 | 82.7 |
| Example 5-2 | Succinyl PVAm Quaternary Ammonium (4/25) | 122.2 | 69.1 |
| Example 7 | Maleyl PVAm Quaternary Ammonium (4/38) | 115.3 | 84.0 |
| Example 8 | Succinyl PVAm (36) | 103.5 | 98.0 |
| Example 8-1 | Succinyl PVAm (18) | 97.6 | 104.8 |

For Table X the data was evaluated using 0.2 weight % of active polymer versus dry paper pulp.

The results in Table X show improved drainage performance from succinyl-PVAm quaternary ammonium and maleyl-PVAm quaternary ammonium (4/38) compared to the blank without additives. The result indicates that succinyl PVAm (18) increases the turbidity a little, with the remaining turbidity at 104.8%.

TABLE XI

Drainage and Fixative Properties of Tertiary PVAm Quaternary Ammonium

| Example | Compositions | Freeness improvement vs. blank, % | Remaining Turbidity, % |
|---|---|---|---|
| Example 10 | Tertiary PVAm Quaternary Ammonium (18:18) | 149.2 | 43 |
| Example 10-1 | Tertiary PVAm Quaternary Animonium (33.3:3.3) | 157.1 | 42 |
| Example 10-2 | Tertiary PVAm Quaternary Ammonium (44:10) | 161.0 | 49 |

For Table XI the data was evaluated using 0.3 weight % of active polymer versus dry paper pulp.

The results in Table XI show improved drainage performance from Tertiary PVAm Quaternary Ammonium compared to the blank without additives.

TABLE XII

Drainage and Fixative Properties of Oligosaccharides Modified Polyvinylamine

| Products | Compositions | Freeness improvement vs. blank, % | Remaining Turbidity, % |
|---|---|---|---|
| Benchmark | PVAm (Hercobond ® 6363) | 158 | 41.5 |
| Example 14 | Lactose (20%)-PVAm | 147 | 42 |
| Example 15 | Maltodextrin (33%)-PVAm | 142 | 51 |
| Example 16 | Maltodextrin (12.5%)-PVAm Quaternary Ammonium (25) | 163 | 40.5 |

For Table XII the data was evaluated using 0.3 weight % of active polymer versus dry paper pulp.

The results in Table XII show comparable drainage performance and turbidity reduction as compared to PVAm (Hercobond® 6363).

TABLE XIII

Drainage and Fixative Properties of Modified Polyvinylamine

| Example | Compositions | Freeness improvement vs. blank, % | Remaining Turbidity, % |
|---|---|---|---|
| Benchmark | PVAm (Hercobond ® 6363) | 161.8 | 40.5 |
| Benchmark | PVAmidine (Hercobond ® 6350) | 161.8 | 39.1 |
| Example 17 | Quaternary PVAm Acetamide (29:7) | 196.8 | 43.6 |
| Example 18 | PVAm Acetamide (29) | 159.4 | 25.5 |
| Example 19 | Tertiary PVAmidine (29) | 141.2 | 55.3 |
| Example 20 | PVAmidine Quaternary Ammonium | 145.5 | 38.3 |
| Example 21 | Tertiary PVAmidine Acetamide (29:7) | 144.9 | 50.9 |

For Table XIII the data was evaluated using 0.3 weight % of active polymer versus dry paper pulp.

The results in Table XIII show improved drainage performance of the two chloroacetamide alkylated polyvinylamine derivatives and three alkylated polyvinylamidine derivatives compared to the blank without additives. Quaternary PVAm Acetamide (29:7) has much better drainage performance than Hercobond® 6363 while PVAm Acetamide (29) is the most effective resin that reduces turbidity of the pulp furnish.

TABLE XIV

Drainage and Fixation Properties of Poly(Vinylamine-co-Acrylic Acid)

| Products | Compositions | Freeness improvement vs. blank, % | Remaining Turbidity, % |
|---|---|---|---|
| Benchmark | PVAm (Hercobond ® 6363) | 131 | 46 |
| Comp. Example 1 | Poly(vinylamine-co-acrylic acid) (80:20) | 138 | 43 |
| Comp. Example 2 | Poly(vinylamine-co-acrylic acid) (30:70) | 106 | 105.2 |

For Table XIV the data was evaluated using 0.2 weight % of active polymer versus dry paper pulp.

The results in Table XIV show improved drainage performance and turbidity reduction from the prior art amphoteric copolymer poly(vinylamine-co-acrylic acid) (80:20) compared to PVAm (Hercobond® 6363). The prior art amphoteric copolymer poly(vinylamine-co-acrylic acid) (30:70) shows slightly improvement in drainage compared to PVAm (Hercobond® 6363) but increases turbidity of the pulp furnish.

Example 27

Evaluations as Stickie and Pitch Control Agents in Papermaking Applications

The effectiveness of polyvinylamine derivatives alkylated with cationic groups and the amphoteric polyvinylamine derivatives prepared in the above examples was compared with a benchmark product, DeTac® DC 3970, a poly(vinyl alcohol-co-vinyl acetate)-based detackifier, for inhibiting organic deposits and tacky contaminants.

The Pitch Deposit Test (PDT) was used for the application evaluations and is a method used to determine the ability of compositions to inhibit pitch deposition. The PDT used a coupon made of adhesive-backed tape as the depositing surface, which was submerged in a 0.5% bleached hardwood pulp solution containing synthetic pitch. After 45 minutes of immersion, the coupons were triple rinsed with deionized water and dried. The deposition of pitch on the coupon was determined by collecting eight readings at 300 nm using a spectrophotometer and averaging these values. In every test, a control sample (no treatment) was run for comparison. The amphoteric polyvinylamine compositions were run at a 2 ppm concentration. The performance of the materials is expressed as percentage reduction of the pitch content over the blank without additives. The dosages of materials are based on active solids in the formulations of the compositions and the benchmark product. The results for two representative examples and the benchmark product are shown in Table XV.

TABLE XV

Pitch Reduction (%) of Cationically Alkylated Polyvinylamine

| Products | Compositions | PDT (%) | PDT of DeTac® DC3970 (%) |
|---|---|---|---|
| Example 1-1 | PVAm Quaternary Ammonium (34) | 60 | 42 |
| Example 1-2 | PVAm Quaternary Ammonium (38) | 56 | 42 |
| Example 3 | C4-PVAm Quaternary Ammonium (6:25) | 78 | 77 |
| Example 4 | C8-PVAm Quaternary Ammonium (4:25) | 65 | 77 |
| Example 5 | Succinyl PVAm Quaternary Ammonium (4/38) | 71 | 70 |
| Example 5-1 | Succinyl PVAm Quaternary Ammonium (4/34) | 66 | 70 |

The higher the percentage number, the better the pitch reduction efficiency the product provides. The results summarized in Table XV show that the polyvinylamine derivatives give improved or comparable performances in reducing pitch and stickies in papermaking processes compared to the commercial product DeTac® DC3970. In the parallel experiments, PVAm quaternary ammonium compositions (Example 1-1 and 1-2) have 60% and 56% pitch reduction efficiency, respectively, as compared to DeTac® DC3970 at 42%, indicating a better performance than the polyvinyl alcohol based detackifier, DeTac® DC3970, in reducing pitch and stickies in papermaking process.

The invention claimed is:

1. A process for preparing a polymer of randomly distributed repeating monomer units having at least two of the formulae (I), (II), (III), (IV), (V), (VI) (VII), (XIII) or (XIV):

(I)

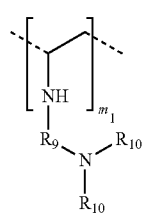

(II)

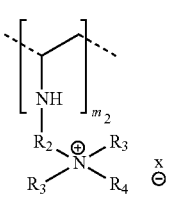

(III)

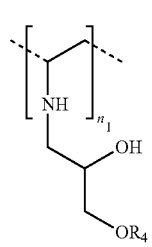

(IV)

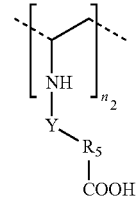

(V)

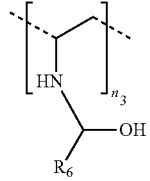

(VI)

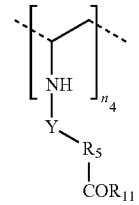

(VII)

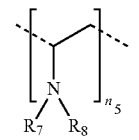

(XIII)

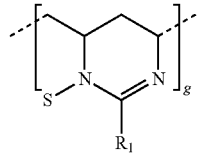

(XIV)

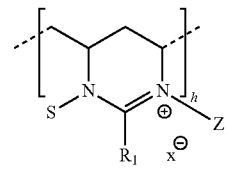

said polymer optionally further comprising randomly distributed repeating monomer units having at least one of the formulae (VIII), (IX), (X), or (XII):

(VIII)

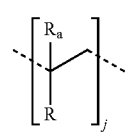

(IX)

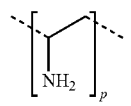

-continued

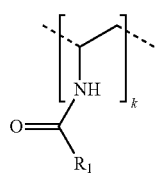

(X)

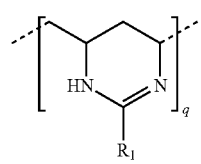

(XII)

wherein
X⁻ is any anion;
Y is —C(=O)— or —CH$_2$— or a single bond;
R is H, —COOH, —COOR$_1$, —CH$_2$NR$_1$R$_4$, —NR$_1$R$_4$, —CONR$_1$R$_4$, —OH, —OCOR$_1$, —OR$_1$, —NO$_2$, —CN, —N$^+$(CH$_3$)$_3$, alkenyl, alkynyl, or alkanoxyl;
R$_1$ and R$_4$ identically or differently are H or a straight chain or branched alkyl containing up to 22 carbons;
R$_a$ is H or CH$_3$;
R$_2$ is a straight chain or branched alkyl group containing up to 12 carbons, optionally substituted with hydroxyl;
R$_3$ is H or a straight chain or branched alkyl containing up to 22 carbons;
R$_5$ is a straight chain or branched alkyl or alkenyl group containing up to 18 carbons;
R$_6$ is a monosaccharide, or oligosaccharide, or polysaccharide moiety, or a straight or branched alkyl group up to 18 carbons, or a hydroxyl-containing or an aldehyde-containing alkyl group;
R$_9$ is a straight chain or branched alkyl group containing up to 12 carbons;
R$_{10}$ is H or a straight chain or branched alkyl containing up to 22 carbons;
R$_{11}$ is —R$_1$, —OR', —NR$_1$R$_4$, or —NH$_2$;
R$_7$ and R$_8$ and S and Z identically or differently are —R$_9$N(R$_{10}$)$_2$, —R$_2$N$^+$(R$_3$)$_2$R$_4$X$^-$, —CH$_2$CH(OH)CH$_2$OR$_4$, —CH(OH)R$_6$, —Y—R$_5$—COOH, or —Y—R$_5$—COR$_{11}$; and
k, j, m$_1$, m$_2$, n$_1$, n$_2$, n$_3$, n$_4$, n$_5$, p, q, g and h independently may be 0 mole percent; and
wherein the sum of m$_1$, m$_2$, n$_1$, n$_2$, n$_3$, n$_4$, n$_5$, g and h, is larger than 0.1 mole percent;
comprising the step of reacting an aqueous solution of vinylamine-containing polymer for a period of time at a reaction temperature with at least two compounds selected from a group consisting of an alkylating agent containing a cationic functional group selected from the group consisting of 3-chloro-2-hydroxypropyltrimethylammonium chloride, 2-(diethylamino)ethyl chloride and combinations thereof; and
the other compound is selected from a group containing an amine-reactive functional group wherein the amine reactive functional group is an alkylating or acylating agent that has or generates a carboxylic acid moiety after acylation or alkylation and is selected from the group consisting of succinic anhydride, succinic anhydride substituted with a straight chain or branched alkyl or alkenyl group containing up to 18 carbons, maleic anhydride, glutaric anhydride, 3-methylglutaric anhydride, 2,2-dimethylsuccinic anhydride, cyclic alkyl carboxylic anhydrides, cyclic alkenyl carboxylic anhydrides, alkenyl succinic anhydride (ASA), chloroacetic acid, bromoacetic acid, halogen-substituted alkanic acid acrylamides, halogen-substituted alkenoic acid acrylamides and combinations thereof; an alkyl glycidyl ether selected from the group consisting of butyl glycidyl ether, 2-ethylhexyl glycidyl ether, hexadecyl glycidyl ether, C$_{12}$/C$_{14}$ glycidyl ethers and combinations thereof; an agent containing an aldehyde functional group selected from the group consisting of glucose, maltose, lactose, maltodextrin, corn syrup, enzymatically hydrolyzed starches, chemically hydrolyzed starches and combinations thereof, and mixtures thereof; and
wherein said vinylamine-containing polymer has a molecular weight in the range of from about 4,000 to about 2,000,000 Daltons.

2. A paper product comprising a polymer of randomly distributed repeating monomer units having at least two of the formulae (I), (II), (III), (IV), (V), (VI), (VII), (XIII) or (XIV):

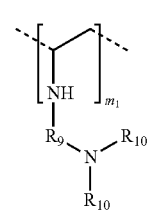

(I)

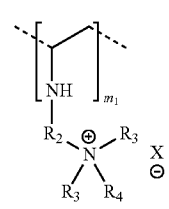

(II)

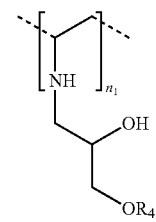

(III)

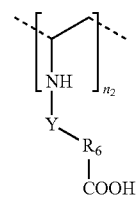

(IV)

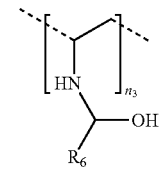

(V)

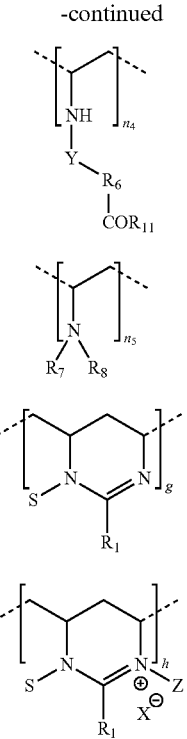

said polymer optionally further comprising randomly distributed repeating monomer units having at least one of the formulae (VIII), (IX), (X), or (XII):

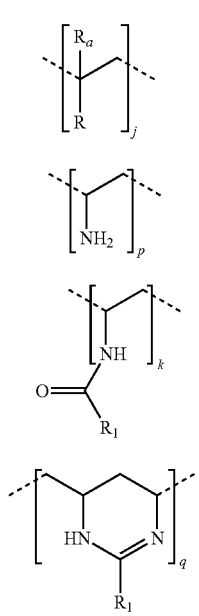

wherein
X⁻ is any anion;
Y is —C(=O)— or —CH$_2$— or a single bond;
R is H, —COOH, —COOR$_1$, —CH$_2$NR$_1$R$_4$, —NR$_1$R$_4$, —CONR$_1$R$_4$, —OH, —OCOR$_1$, —OR$_1$, —NO$_2$, —CN, —N⁺(CH$_3$)$_3$, alkenyl, alkynyl, or alkanoxyl;
R$_1$ and R$_4$ identically or differently are H or a straight chain or branched alkyl containing up to 22 carbons;

R$_a$ is H or CH$_3$;
R$_2$ is a straight chain or branched alkyl group containing up to 12 carbons, optionally substituted with hydroxyl;
R$_3$ is H or a straight chain or branched alkyl containing up to 22 carbons;
R$_5$ is a straight chain or branched alkyl or alkenyl group containing up to 18 carbons;
R$_6$ is a monosaccharide, or oligosaccharide, or polysaccharide moiety, or a straight or branched alkyl group up to 18 carbons, or a hydroxyl-containing or an aldehyde-containing alkyl group;
R$_9$ is a straight chain or branched alkyl group containing up to 12 carbons;
R$_{10}$ is H or a straight chain or branched alkyl containing up to 22 carbons;
R$_{11}$ is —R$_1$, —OR$_1$, —NR$_1$R$_4$, or —NH$_2$;
R$_7$ and R$_8$ and S and Z identically or differently are —R$_9$N(R$_{10}$)$_2$, —R$_2$N⁺(R$_3$)$_2$R$_4$X⁻, —CH$_2$CH(OH)CH$_2$OR$_4$, —CH(OH)R$_6$, —Y—R$_5$—COOH, or —Y—R$_5$—COR$_{11}$; and
k, j, m$_1$, m$_2$, n$_1$, n$_2$, n$_3$, n$_4$, n$_5$, p, q, g and h independently may be 0 mole percent; and
wherein the sum of m$_1$, m$_2$, n$_1$, n$_2$, n$_3$, n$_4$, n$_5$, g and h, is larger than 0.1 mole percent.

3. A method of making paper comprising adding to a papermaking slurry a polymer comprising randomly distributed repeating monomer units having at least two of the formulae (I), (II), (III), (IV), (V), (VI), (VII), (XIII) or (XIV):

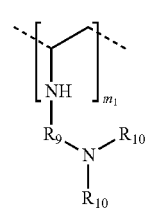

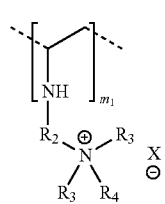

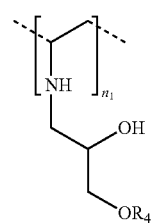

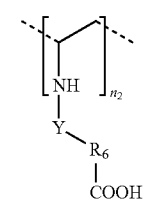

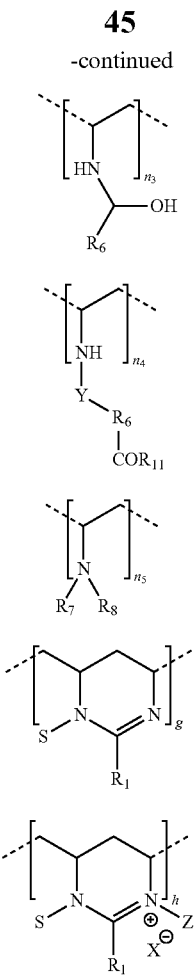

said polymer optionally further comprising randomly distributed repeating monomer units having at least one of the formulae (VIII), (IX), (X), or (XII):

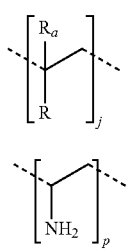

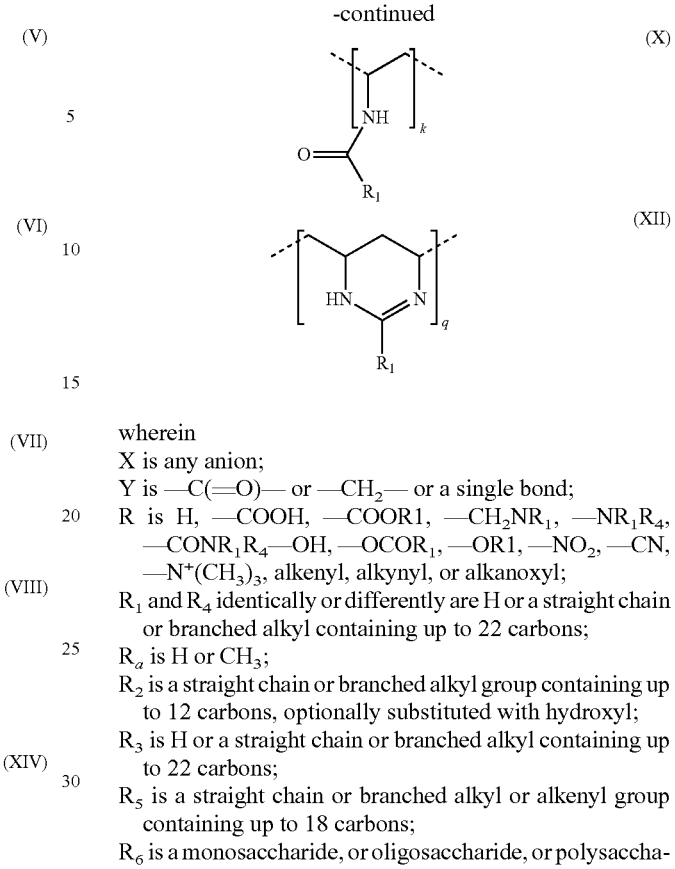

wherein
X is any anion;
Y is —C(=O)— or —CH$_2$— or a single bond;
R is H, —COOH, —COOR1, —CH$_2$NR$_1$, —NR$_1$R$_4$, —CONR$_1$R$_4$—OH, —OCOR$_1$, —OR1, —NO$_2$, —CN, —N$^+$(CH$_3$)$_3$, alkenyl, alkynyl, or alkanoxyl;
R$_1$ and R$_4$ identically or differently are H or a straight chain or branched alkyl containing up to 22 carbons;
R$_a$ is H or CH$_3$;
R$_2$ is a straight chain or branched alkyl group containing up to 12 carbons, optionally substituted with hydroxyl;
R$_3$ is H or a straight chain or branched alkyl containing up to 22 carbons;
R$_5$ is a straight chain or branched alkyl or alkenyl group containing up to 18 carbons;
R$_6$ is a monosaccharide, or oligosaccharide, or polysaccharide moiety, or a straight or branched alkyl group up to 18 carbons, or a hydroxyl-containing or an aldehyde-containing alkyl group;
R$_9$ is a straight chain or branched alkyl group containing up to 12 carbons;
R$_{10}$ is H or a straight chain or branched alkyl containing up to 22 carbons;
R$_{11}$ is —R$_1$, —OR$_1$, NR$_1$R$_4$, or —NH$_2$;
R$_7$ and R$_8$ and S and Z identically or differently are —R$_9$N(R$_{10}$)$_2$, —R$_2$N$^+$(R$_3$)$_2$R$_4$X$^-$, —CH$_2$CH(OH)CH$_2$OR$_4$, —CH(OH)R$_6$, —Y—R$_5$—COOH, or —Y—R$_5$—COR$_{11}$;
and k, j, m$_1$, m$_2$, n$_1$, n$_2$, n$_3$, n$_4$, n$_5$, p, q, g and h independently may be 0 mole percent; and wherein the sum of m$_1$, m$_2$, n$_1$, n$_2$, n$_3$, n$_4$, n$_5$, g and h, is larger than 0.1 mole percent.

4. The paper product of claim 2, wherein the polymer comprises the formula (XI), and the sum of k, j, m$_1$, m$_2$, n$_1$, n$_2$, n$_3$, n$_4$, n$_5$, and p is 100 mole percent, and the sum of m$_1$, m$_2$, n$_1$, n$_2$, n$_3$, n$_4$, and n$_5$ is larger than 0.1 mole percent.

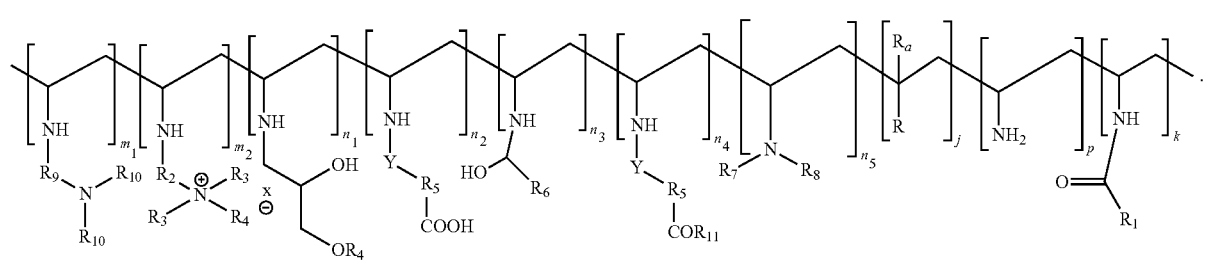

5. The method according to claim 3, wherein the polymer comprises the formula (XI), and the sum of $k, j, m_1, m_2, n_1, n_2, n_3, n_4, n_5$, and $p$ is 100 mole percent, and the sum of $m_1, m_2, n_1, n_2, n_3, n_4$, and $n_5$ is larger than 0.1 mole percent,

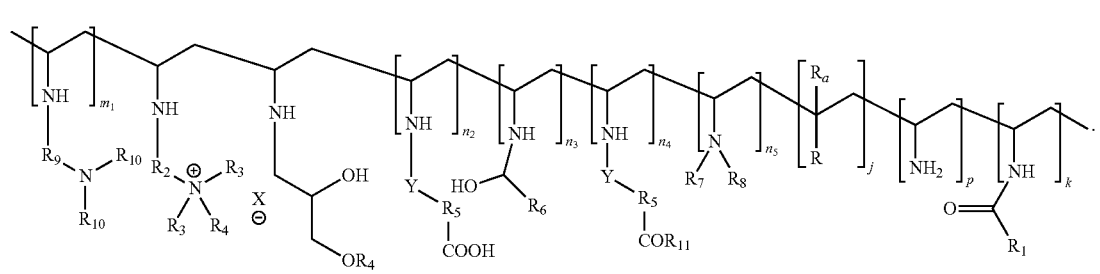

(XI)

6. The method according to claim 3, wherein the at least two formulae of the polymer are selected from formula I, formula II, and formula III.

7. The method according to claim 3, wherein the at least two formulae of the polymer are selected from formula I, formula II, and formula IV.

8. The method according to claim 3, wherein the at least two formulae of the polymer are selected from formula I, formula II, and formula V.

9. The method according to claim 3, wherein the at least two formulae of the polymer are selected from formula I, formula II, and formula VI.

\* \* \* \* \*

UNITED STATES PATENT AND TRADEMARK OFFICE
CERTIFICATE OF CORRECTION

PATENT NO. : 8,604,134 B2  
APPLICATION NO. : 12/221220  
DATED : December 10, 2013  
INVENTOR(S) : Gu et al.

Page 1 of 1

It is certified that error appears in the above-identified patent and that said Letters Patent is hereby corrected as shown below:

In the Claims

In Column 41, Line 43: "$R_{11}$ is $-R_1$, -OR'. $-NR_1R_4$, or $-NH_2$;" should read -- $R_{11}$ is $-R_1$, $-OR_1$, $-NR_1R_4$, or $-NH_2$; --

Signed and Sealed this  
Twenty-seventh Day of March, 2018

Andrei Iancu  
*Director of the United States Patent and Trademark Office*